US012754140B2

(12) United States Patent
Tsai et al.

(10) Patent No.: US 12,754,140 B2
(45) Date of Patent: Oct. 6, 2026

(54) TILT AND FOCUSING ADJUSTMENT FOR CONSISTENT GEM IMAGING

(71) Applicant: Gemological Institute of America, Inc. (GIA), Carlsbad, CA (US)

(72) Inventors: Tsung-Han Tsai, Maywood, NJ (US); Hiroshi Takahashi, Fort Lee, NJ (US); Mehdi Toosi, Clifton, NJ (US); Muhammed Bagdigen, Parsippany, NJ (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 271 days.

(21) Appl. No.: 18/104,224

(22) Filed: Jan. 31, 2023

(65) Prior Publication Data

US 2023/0243758 A1 Aug. 3, 2023

Related U.S. Application Data

(60) Provisional application No. 63/305,582, filed on Feb. 1, 2022.

(51) Int. Cl.
*G01N 21/87* (2006.01)
*G01N 21/17* (2006.01)

(52) U.S. Cl.
CPC ............. *G01N 21/87* (2013.01); *G01N 21/17* (2013.01); *G01N 2021/1765* (2013.01); *G01N 2201/025* (2013.01); *G01N 2201/12723* (2013.01)

(58) Field of Classification Search
CPC .................. G01N 21/87; G01N 21/17; G01N 2021/1765; G01N 2201/025; G01N 2201/12723
See application file for complete search history.

(56) References Cited

U.S. PATENT DOCUMENTS

| | | | | |
|---|---|---|---|---|
| 6,980,283 | B1 | 12/2005 | Aggarwal | |
| 2008/0055582 | A1 | 3/2008 | Lapa et al. | |
| 2011/0228063 | A1* | 9/2011 | Smith | G01N 21/87 356/30 |
| 2013/0329212 | A1* | 12/2013 | High | G02B 21/26 356/30 |

(Continued)

FOREIGN PATENT DOCUMENTS

| | | | |
|---|---|---|---|
| GB | 2477164 | A | 7/2011 |
| JP | 2004219251 | A | 8/2004 |

(Continued)

OTHER PUBLICATIONS

Wang, D., et al., "Automated Opal Grading by Imaging and Statistical Learning," IEEE Transactions on Systems, Man, and Cybernetics: Systems, vol. 46, No. 2, Feb. 2016.

(Continued)

*Primary Examiner* — Jonathan M Hansen
(74) *Attorney, Agent, or Firm* — DLA PIPER LLP (US); Blake W. Jackson; Thomas J. Fuller

(57) ABSTRACT

Systems and methods here may be used for automated alignment and focus adjustment for one or multiple sample gemstones on a stage, including determining gemstone sample tilt based on image data, automatically moving a stage to align the tilted sample, determining a focal plane that overlaps a focal point of a camera with the gemstone, and automatically moving a stage to the focal plane.

19 Claims, 15 Drawing Sheets

(56) References Cited

U.S. PATENT DOCUMENTS

| | | | | |
|---|---|---|---|---|
| 2014/0063485 | A1* | 3/2014 | Palmieri | G01N 21/87<br>356/30 |
| 2014/0191107 | A1* | 7/2014 | Lee | G02B 5/005<br>250/201.1 |
| 2016/0025643 | A1* | 1/2016 | Palmieri | G01N 21/87<br>356/30 |
| 2016/0103078 | A1 | 4/2016 | Smith | |
| 2020/0050834 | A1 | 2/2020 | Niskanen | |
| 2021/0302322 | A1 | 9/2021 | Tsai et al. | |
| 2023/0243758 | A1 | 8/2023 | Tsai et al. | |

FOREIGN PATENT DOCUMENTS

| | | | |
|---|---|---|---|
| WO | 2003/070043 | A2 | 8/2003 |
| WO | 2023/150130 | A1 | 8/2023 |

OTHER PUBLICATIONS

Extended European Search Report for Application No. 23750118.4, dated Nov. 3, 2025, 9 pages.

International Preliminary Report on Patentability for International Application No. PCT/US2023/012030, dated Aug. 15, 2024, 9 Pages.

International Search Report and Written Opinion for International Application No. PCT/US2023/012030, dated Jun. 6, 2023, 10 Pages.

* cited by examiner

TILT AND FOCUSING ADJUSTMENT FOR CONSISTENT GEM IMAGING

CROSS REFERENCE TO RELATED APPLICATION

This application claims priority to U.S. Provisional Application No. 63/305,582 filed on Feb. 1, 2022, the entirety of which is hereby incorporated by reference.

FIELD

The field includes systems and methods for improving digital image quality, automated alignment of instruments used for analyzing a diamond or other gemstone, and/or analysis of digital images.

BACKGROUND

Automated techniques for analyzing gemstones rely on machine vision, visual evaluation, image processing, and other techniques for analyzing digital image data, in some cases machine learning and/or deep learning based techniques. For example, the systems and methods may be used capture images of gemstone samples that are analyzed to grade, identify, and authenticate the gemstone samples.

Unfortunately, consistent imaging of the gemstone samples is required for accurate analysis. The images used for analysis must also be high quality (i.e., have a high resolution and capture the gemstone in focus) in order to clearly show all of the features required to identify or evaluate a sample. Failure to achieve the accurate alignment of the gemstone sample may result inconsistent images, out of focus images, and blurry images. This is because reflection patterns from facet gemstones are dependent on orientation of the samples. Without consistent image data to use for analysis, gemstone grading, identification, and authentication may be primarily dependent on the quality of the image used for analysis or the subjective opinion of a human grader instead of the characteristics of the gemstone. Accordingly, achieving reproducible results for gemstone analysis is impossible without techniques that enable the images used for analysis to consistently and accurately capture the features of each gemstone sample analyzed. For grading gemstones, consistency and accuracy are both integral. This means even tricky situations, for example where a sample thickness is above the depth of field of an imaging system, should be consistently aligned with the focal plane at the same height position of the samples.

Traditionally, gemstone samples were aligned for imaging and camera focus was adjusted manually by human users based on visual evaluation. Such human users visually align the gemstone sample and focus the gemstone for the camera using their own intuition and adjust the alignment and focus based on a digital image preview. Manual alignment and focus, however, are tedious, time consuming, inconsistent, and not sensitive enough to capture small features of gemstones that may be difficult to see with the naked eye. These limitations slow down the alignment and focus adjustment process and eliminates automated screening efficiencies.

Alternative methods for adjusting tilt include using reference laser spots or circular alignment marks to facilitate visual evaluation. While these aids may improve manual alignment methods, they are difficult to use, do not improve sensitivity, and can still be inconsistent absent methods of ensuring the alignment marks are always in the same place. Facet wireframe analysis may also be used to for tilt adjustment, but this method is slow and is dependent on the cut of the gemstone sample. Alternative methods for adjusting focus include relying on a camera's auto focusing function and using a side viewing camera (shadow image). These methods, however, do not enable fine focus adjustments that are often required to clearly show small, hard to see features and the side shadow image is often obfuscated by the shadow of the gemstone holder that steadies the gemstone sample on the stage.

Accordingly, there is a need for an automated system that provides for consistent imaging of a variety of gemstone samples across different capture conditions.

SUMMARY

Embodiments of the present disclosure may include a method of aligning a gemstone with a digital camera, the method including by a computer with a processor and memory, in communication with a digital camera, an adjustable aperture mounted on the digital camera, a light source, and at least one stage motor configured to move a stage. Embodiments may also include determining if the gemstone on the stage may be aligned with the digital camera, by analyzing a captured digital image of the gemstone taken by the digital camera.

In some embodiments, the at least one stage motor may be capable of moving the stage in yaw, pitch, and roll directions while keeping the X, Y and Z directions fixed, and rotating the stage on a pitch or roll axis. Embodiments may also include, if the gemstone may be not aligned, by the computer, aligning the gemstone with the camera by sending instruction to a light source to generate a source beam of light that may be directed by a beam splitter toward a surface of the gemstone.

Embodiments may also include opening the adjustable aperture to receive a beam of reflected light reflected from the surface of the gemstone and capturing an initial image of the gemstone. Embodiments may also include determining a location and a tilt of the gemstone based on the initial image. Embodiments may also include sending instruction to the motor to rotate the stage on at least one of the pitch or roll axis to align the tilt of the gemstone with the camera so that a table of the gemstone may be perpendicular to the camera and a table reflection may be visible in a field of view of the camera. Embodiments may also include sending instruction to the motor to move the stage in at least one of the yaw, pitch and roll directions while keeping the X, Y and Z directions fixed to center the table reflection within the field of view of the camera. Embodiments may also include capturing, by the digital camera, an image of the gemstone that includes the table reflection.

In some embodiments, the method, further including performing a surface polishing and blemish analysis for the gemstone based on the table reflection. In some embodiments, the determining the tilt of the gemstone based on the initial image may include generating a distribution of saturated pixels. Embodiments may also include determining a center pixel for an area of saturated pixels in the distribution that corresponds to the table reflection of the gemstone. Embodiments may also include determining a pixel shift equal to a number of pixels between the center pixel of the area of saturated pixels and a center of the field of view of the camera. Embodiments may also include converting the pixel shift to a number of degrees of tilt.

In some embodiments, the method, further including reducing the adjustable aperture to confine the beam of reflected light to a smaller portion of the field of view of the camera and capturing a second image of the gemstone. Embodiments may also include determining a fine adjustment for the tilt of the gemstone based on the second image. Embodiments may also include sending instruction to the motor to rotate the stage on at least one of the pitch or roll axis to align the tilt of the gemstone with the camera based on the fine adjustment.

In some embodiments, the method, further including determining if the stage may be aligned with the digital camera, by analyzing a captured digital image of a mirror on the stage taken by the digital camera and. Embodiments may also include, if the stage may be not aligned, by the computer, aligning the stage with the camera based on an image of a beam spot produced by a beam of reflected light reflected from a surface on the stage.

In some embodiments, the aligning the stage with the digital camera may include sending instruction to a light source to generate a source beam of light that may be directed by a beam splitter toward a surface of the mirror. Embodiments may also include opening the adjustable aperture to receive the beam spot and capturing an initial image of the mirror. Embodiments may also include determining a location and a tilt of the stage based on the initial image.

Embodiments may also include sending instruction to the motor to rotate the stage on at least one of the pitch or roll axis to align the tilt of the stage with the camera so that a surface of the stage may be perpendicular to the camera and the beam spot may be visible in a field of view of the camera. Embodiments may also include sending instruction to the motor to move the stage in at least one of yaw, pitch, and roll, while keeping the X, Y and Z directions fixed to center the beam spot within the field of view of the camera. Embodiments may also include defining the centered beam spot as a reference point for calibration.

In some embodiments, the aligning the stage with the digital camera further may include reducing the adjustable aperture to confine the beam spot to a smaller portion of the field of view of the camera and capturing an image of the confined beam spot. Embodiments may also include determining a fine adjustment for the tilt of the stage based on the image of the confined beam spot. Embodiments may also include sending instruction to the motor to rotate the stage on at least one of the pitch or roll axis to align the tilt of the stage with the camera based on the fine adjustment.

In some embodiments, the method, further including determining if the gemstone on the stage may be in focus for the digital camera, by analyzing the captured digital image of the gemstone taken by the digital camera. Embodiments may also include, if the gemstone may be not in focus, by the computer, focusing the gemstone for the camera by determining a Z height adjustment required to focus the gemstone for the camera. Embodiments may also include and sending instruction to the motor to move the stage in a Z direction that corresponds to the Z height adjustment.

In some embodiments, the determining the Z height adjustment further may include capturing, by the digital camera, a pixelated image of the gemstone on the stage. Embodiments may also include determining, by the computer, the diameter of the gemstone based on the captured pixelated image of the gemstone. Embodiments may also include estimating a focal plane that overlaps a focal point of the digital camera with the gemstone based on the diameter. Embodiments may also include determining the Z height adjustment based on a distance required to move the digital camera to the focal plane.

In some embodiments, the determining the diameter of the gemstone further may include generating a pixelated mask over the portion of the image that includes the gemstone. Embodiments may also include determining a width of the gemstone in pixels based on the pixelated mask. Embodiments may also include converting the width of the gemstone in pixels into a diameter of the gemstone based on a pixel size of the image and a magnification of the camera.

In some embodiments, the determining the Z height adjustment further may include receiving wireframe data for the gemstone. Embodiments may also include determining a total depth and a crown height of the gemstone based on the wireframe data. Embodiments may also include estimating a focal plane that overlaps a focal point of the digital camera with the gemstone based on the total depth and the crown height. Embodiments may also include determining the Z height adjustment based on a distance required to move the digital camera to the focal plane.

In some embodiments, the determining the Z height adjustment further may include capturing, by a camera placed opposite the light source, a side image of the gemstone on the stage. In some embodiments, the side image may be a dark image that includes an outline of the gemstone and a bright background. Embodiments may also include determining a focal plane that overlaps a focal point of the digital camera with the gemstone based on the dark image. Embodiments may also include determining a Z height adjustment based on a distance required to move the digital camera to the focal plane.

In some embodiments, the determining the focal plane based on the dark image further may include identifying an area between the table and a girdle of the gemstone as a focus point. Embodiments may also include determining a number of pixels between the focus point and the stage. Embodiments may also include converting the number of pixels to a distance based on a pixel size of the dark image and a magnification of the camera. Embodiments may also include determining the focal plane based on the distance.

Embodiments of the present disclosure may also include a method of focusing a digital camera on a gemstone, the method including by a computer with a processor and memory, in communication with a digital camera, a side camera, and at least one stage motor configured to move a stage. Embodiments may also include determining if the gemstone on the stage in focus for the digital camera, by analyzing a captured digital image of the gemstone taken by the digital camera.

In some embodiments, the at least one stage motor may be capable of moving the stage in a Z direction. Embodiments may also include, if the gemstone may be not in focus, by the computer, focusing the gemstone for the camera by determining a Z height adjustment required to focus the gemstone for the camera. Embodiments may also include sending instruction to the motor to move the stage in a Z direction that corresponds to the Z height adjustment. Embodiments may also include capturing, by the digital camera, an image of the gemstone in focus with the digital camera.

Embodiments of the present disclosure may also include a system for aligning gemstones, the system including a computer with a processor and a memory, in communication with a digital camera. Embodiments may also include at least one motor configured to move a stage, a light source, and an adjustable aperture mounted to the light source. In some embodiments, the stage configured to receive a gemstone for analysis. In some embodiments, the digital camera mounted with a field-of-view covering at least a portion of the stage where the gemstone may be received.

In some embodiments, the light source configured to generate a source beam of light that may be directed by a beam splitter toward a surface of the gemstone. In some embodiments, the adjustable aperture configured to receive a beam of reflected light reflected from the surface of the gemstone. In some embodiments, the computer may be configured to determine a location and a tilt of the gemstone based on an initial image captured by the digital camera.

Embodiments may also include send instruction to the at least one motor to rotate the stage on at least one of the pitch or roll axis to align the tilt of the gemstone with the camera so that the table of the gemstone may be perpendicular to the camera and a table reflection may be visible in a field of view of the camera. Embodiments may also include send instruction to the at least one motor to move the stage in at least one of the yaw, pitch and/or roll while keeping the X, Y and Z direction fixed to center the table reflection within the field of view of the camera.

In some embodiments, the digital camera may be further configured to capture an image of the gemstone that includes the table reflection. In some embodiments, the computer may be further configured to perform a surface polishing and blemish analysis for the gemstone based on the table reflection. In some embodiments, the adjustable aperture may be configured to reduce in size to confine the beam of reflected light to a smaller portion of the field of view of the digital camera. In some embodiments, the digital camera may be further configured to capture a second image of the gemstone that includes the confined reflected beam in a portion of the field of view of the camera. In some embodiments, the computer may be further configured to determine a fine adjustment for the tilt of the gemstone based on the second image. Embodiments may also include send instruction to the motor to rotate the stage on at least one of the pitch or roll axis to align the tilt of the gemstone with the camera based on the fine adjustment.

In some embodiments, the computer may be further configured to determine if the gemstone on the stage may be in focus for the digital camera, by analyzing the captured digital image of the gemstone taken by the digital camera. Embodiments may also include, if the gemstone may be not in focus, by the computer, focus the gemstone for the camera by determining a Z height adjustment required to focus the gemstone for the camera. Embodiments may also include send instruction to the at least one motor to move the stage in a Z direction that corresponds to the Z height adjustment. In some embodiments, the light source includes one or more Light Emitting Diodes (LEDs) arranged to illuminate the stage. In some embodiments, the LEDs may be configured to emit white light.

BRIEF DESCRIPTIONS OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Figure 1A:
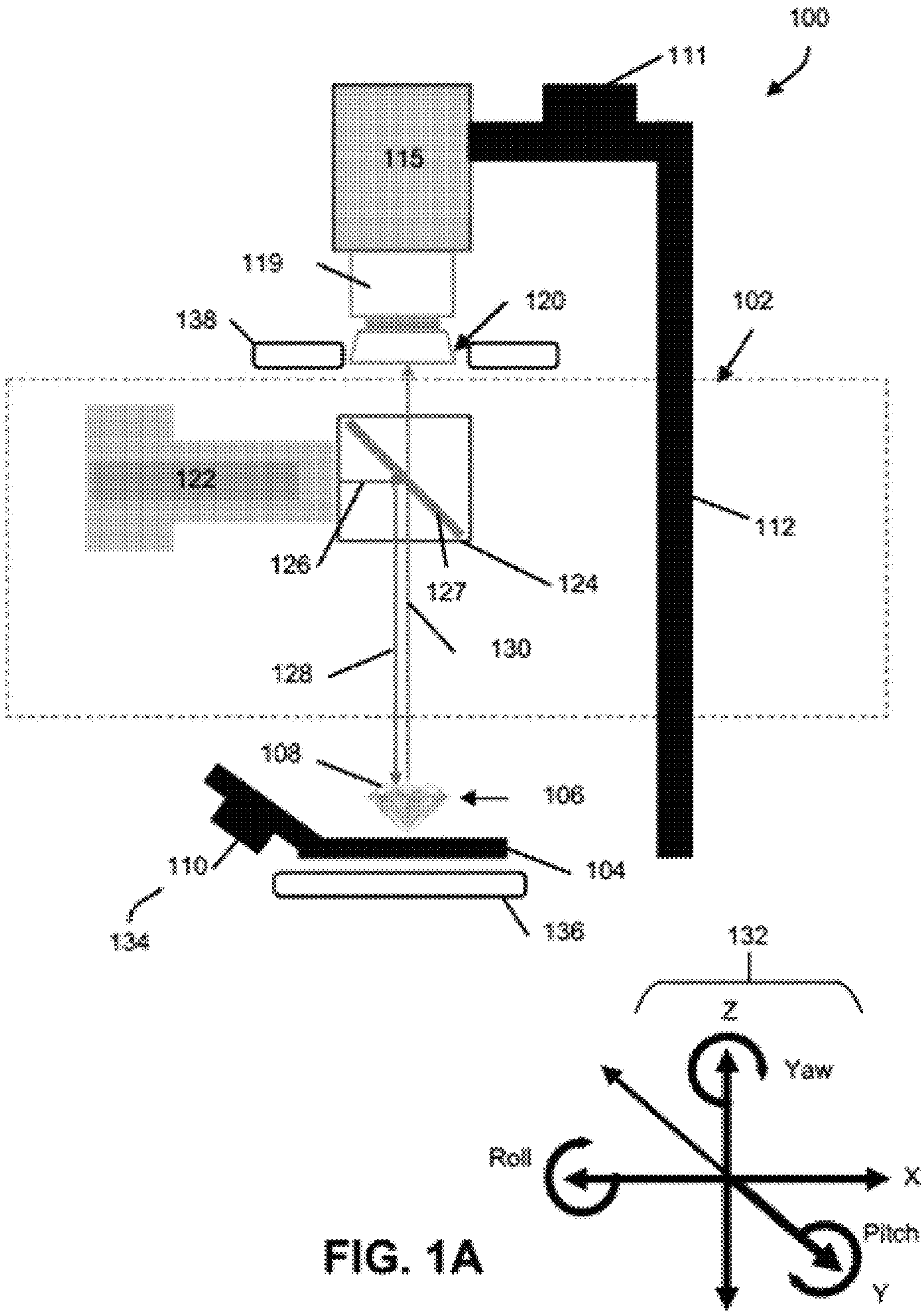
FIGS. 1A and 1B are an illustration of an example imaging system in accordance with certain aspects described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

Systems and methods described here may be used to align one or multiple gemstone samples with an imaging and/or lighting system on a stage arranged with automated motors in communication with computer systems as described. Since such alignment may be based on the imaging system as well as an image processing algorithm(s), the entire system may be enclosed to meet any kind of human safety requirements, ensure any required sterile and clean conditions, and also provide a solution for automated alignment of sample gemstones for accurate and speedy analysis.

Digital image analysis is an effective method for identification and evaluation of materials such as gemstones. For example, one application may be to evaluate the quality of gemstones based on their size, cut, clarity, color, and authenticity. Other analysis may include determination of whether clarity enhancement techniques are used on a gemstone such as fillers, oils, resins, or other compounds or chemical, such as those used to help emeralds. Computer vision techniques may process images of the gemstone facets to determine quantitative metrics that may be used to make the gemstone evaluation process more accurate and consistent relative to manual analysis. Features extracted from digital images may also be used to distinguish gemstones composed of natural materials from samples made of synthetic compounds and identify a particular graded gemstone from other similar looking samples.

The accuracy and repeatability of these techniques for digital image analysis may be dependent on the quality of the images that are used for analysis. To capture high quality images that clearly capture the features of gemstone sample and have sufficient resolution and contrast to view a table reflection and other difficult to see features, each sample must be aligned with the one or multiple cameras capturing the images of the sample. For example, the sample must be in focus (i.e., located at the focal point of the camera) and have an orientation that is aligned with the one or multiple cameras. Previously, the application of imaging systems to samples was limited to manual adjustment of the cameras and samples until the systems and methods described here.

The systems and methods described here may be used to generate consistent images for samples of many multiple sizes and shapes of gemstones, including those sitting in sample holders or mounted in jewelry or other mounts that might be difficult to otherwise analyze. In some examples, only portions of gemstone may be seen in a mounted piece of jewelry, and other portions obscured. Additionally, gemstones may have a natural tilt when mounted or sitting in holders. The titling depends on the shape of the gemstone and the type of mounts or holders so each sample may need to be adjusted differently to correct the alignment for different amounts and directions of tilt. The amount of tilt adjustment may not be readily ascertainable from overhead images so the tilt adjustment mechanisms described herein may rely on reflected light and other features to determine the change in position required to align the sample.

The systems and methods described herein may be used to focus one or more cameras on a variety of mounted and unmounted gemstone samples. The focal plane may depend on the depth of the gemstone so the focus may be adjusted to account for the unique size of each sample. Traditional functions for auto-focusing rely on sharp (i.e., reference) features in the sample to determine the focal plane. Gemstone samples do not have sharp features on the surface so determining the focal plane using overhead images may be problematic. Additionally, the ideal focal plane may be located between the table and the girdle of the gemstone so no sharp edges of the sample can be used as a reference for focusing. Determining the focal plane based on side images may also be difficult because shadow images capturing the side of the sample may be obscured by the mount or holder. Therefore, the focusing techniques described herein may rely on features of the sample that are not just present on the surface and that may be determined from overhead images.

The system for tilt alignment and focus adjustment described herein may be used to generate consistent images of mounted and unmounted gemstones having many multiple sizes and shapes. The system removes the requirement of disgorging a gemstone from a mount in order to properly analyze it. This saves time, money, potential damage, and effort in analyzing many multiple gemstones in a mounted condition, without removal, and while in an ordinary state. Further, the automated movement of the samples on the stage may enable fine adjustments that improve the reproducibility for imaging small features and table reflections. Such fine adjustments are tedious or even impossible to do manually but are required to capture gemstones in sufficient detail to enable surface polishing and blemish analysis.

In some examples, additionally or alternatively, the camera may be mounted such that the field of view is down onto a stage where the samples may be placed, where the camera may be used to capture images used for positioning of the stage. In some examples, additionally or alternatively the camera may have an adjustable aperture that may be adjusted to confine the direction of the light reflected from the surface of a sample on the stage. In some examples, additionally or alternatively, one or multiple cameras may be mounted such that the field of view is across the stage where the samples are located to capture a side surface of the stage or sample. The camera images may be used to confirm the sample positioning on a stage, and view the samples, while a computer may conduct the image analysis required to adjust the sample and or camera to improve the quality of the images.

Additionally or alternatively, automated movement of the sample stage, may be configured using the systems and methods described herein to ensure proper alignment of the sample and camera using motors on hardware frame elements. In some examples, feedback loops of image analysis may cause the computer system to automatically adjust positions the camera and/or stage in order to obtain desired images.

Example Alignment and Focus Adjustment

The systems and methods here may be used to localize the position of a gemstone sample and to calculate the actual distances in horizontal, vertical, and angular directions as well as or alternatively, the yaw, pitch, and/or roll angles that need to be moved in order to align the sample for consistent imaging. The imaging system may include one or multiple cameras which perform three main functions: to align the tilt of the sample to clearly capture the table (i.e., the top surface) of the sample, localize the sample position on the horizontal plane, and confirm the vertical position of the sample is overlapped with the focal point of the overhead camera. Since most of the camera has limited depth of field (that produces a sharp image within this range) and the sample may be thicker than the camera depth of field, this method may be used to consistently align the same vertical position of the sample to overlap with the focal plane of the camera.

The first function may use a dichroic beam splitter to direct light from a light source toward a gemstone sample. In some examples, additionally or alternatively, the light source may produce light that is sensitive to tilt and roll when reflected on a flat surface. For example, the light source may be a light emitting diode (LED) without collimation, a laser, or a laser with an expanding beam. An adjustable aperture may be used to restrict the amount of reflected light that enters the camera lens. In some examples, additionally or alternatively, the adjustable aperture may range from a widest aperture of f/1.4 to a smallest aperture of f/32 where f is the focal length of the camera lens. For example, for a camera lens having a focal length of 20 mm, the widest aperture may be 14.3 mm in diameter and the smallest aperture may be 0.63 mm in diameter. In some examples, additionally or alternatively, the adjustable aperture may be motorized to continuously adjust the size of the aperture. For example, the adjustable aperture may start at the widest aperture size (e.g., f/1.4) and continuously get smaller to increase the sensitivity of the camera system to changes in the tilt of the sample.

In non-limiting examples here, the largest camera aperture is ~f/5.6 and the smallest aperture is ~f/22. The working distance of the camera in such examples may be 203 mm.

The angular movement required to align the sample may be calculated by a computer system using the images collected at the different aperture sizes. In such examples, angular movement parameters may be sent to the motorized translation stage and its correlated motors to move, rotate, or otherwise adjust the sample for alignment.

The second function may use a wide angle imaging lens which has enough field of view to cover the one or multiple samples. In some examples, additionally or alternatively, the field of view can be set as 30 mm by 25 mm, which may be wide enough to cover most samples on a typical stage. One example field-of-view for screening/scanning application may at least cover around 20 mm field of view, which is <0.45× magnification when using a ⅔ inch frame size camera. In another non-limiting example, the systems here may include using 0.563× with a ⅔ inch camera. Any range of camera setups may be used, and these examples are not intended to be limiting.

Such an example imaging system may have low or no image distortion across the entire field of view. A conversion factor may be calculated between the pixel size in the imaging system and the actual distance in the image plane using a stage micrometer. The stage micrometer may be a piece of glass with micrometer patterns, similar to a ruler, which may be used for imaging system calibration.

In these examples, most of the sample gemstone may be deeper than the depth of field of the camera, therefore, the system may try to constantly overlap the same vertical position with the camera focal plane. The system may estimate the ideal focal plane based on the image of the sample. Since most of the gemstones such as diamonds, especially round brilliant cut diamonds, are cut based on similar aspect ratios, using the diameter of the diamond can define a certain vertical position to be focused by the camera.

The diameter information may be calculated by dividing the pixel size and camera magnification. For example, in one non-limiting example, one image pixel is 3.450/0.563=6.128 μm. This might be different for different camera magnifications and may be calculated as described. The imaging system may be one camera or multiple cameras with different magnifications, in various non-limiting examples.

The horizontal movement may be calculated by a computer system using the collected images from the wide field of view camera to align the tested sample with the camera aperture. In such examples, horizontal movement parameters may be sent to the motorized translation stage to move the sample for alignment. After the initial horizontal alignment, the vertical axis movement may be calculated by the computer system using the images from the camera to overlap the gemstone sample with the focal plane of the camera. The focus alignment process may scan the imaging system across the sample and capture one or multiple images to calculate a diameter or other size measurements of the sample. A focused vertical position may then be determined based on the size measurements. The stage may then be moved to position the sample at the in-focus vertical position. It is possible that after vertical positioning, another tilt alignment, horizontal alignment, or back and forth horizontal and vertical alignment may be utilized. In some examples, additionally or alternatively, one camera may be used instead of two.

Once the gemstone is in alignment and in focus with camera, the imaging system may capture digital images of the sample that are used for analysis. The process from alignment to focus adjustment to imaging may be repeated for each individual sample.

Hardware Setup Examples

FIG. 1 shows an example hardware setup of the equipment which may be used to employ the methods described herein. As shown in FIG. 1, the reflected beam 130 within the field of view for the camera 115 may allow for alignment of the gemstone(s) 106 arranged in/on the stage 104. In some examples, additionally or alternatively, the camera 115 may include a lens 119. In some examples, additionally or alternatively, as discussed above, the camera 115 lens 119 may be an Imaging lens for example, but not limited to a Fixed magnification imaging lens, Macro lens (for less distortion), Telecentric lens (for long working distance), and/or manually or motorized adjustable magnification imaging lens (for changing field of view) in any combination. The imaging lens 119 may also include manual or motorized focusing such as, but not limited to a digital single-lens reflex camera (DSLR).

In some examples, additionally or alternatively, an adjustable aperture 120 may adjust the portion of the camera 115 lens 119 that may receive light. In some examples, this aperature aperture may be motorized and/or automatically adjustable in communication with a computer system as described. For example, the adjustable aperture 120 may be motorized to continuously adjust the size of the area of the camera 115 lens 119 that receives light. The adjustable aperture 120 may be integrated into the camera 115 lens 119. The adjustable aperture may also be a separate component that is mounted to the camera 115 lens 119.

In some examples, additionally or alternatively, an adjustable aperature 120 may adjust the portion of the camera 115 lens 119 that may receive light. In some examples, this aperature may be motorized and/or automatically adjustable in communication with a computer system as described. For example, the adjustable aperature 120 may be motorized to continuously adjust the size of the area of the camera 115 lens 119 that receives light. The adjustable aperature 120 may be integrated into the camera 115 lens 119. The adjustable aperature may also be a separate component that is mounted to the camera 115 lens 119.

In some examples, the gemstone sample may be required to be placed in a table up position. In such examples, an operator may simply place any number of sample gemstones 106 in holders or without holders on the stage 104 for analysis to align them table up, and then move the stage 104 and/or the camera 115 to position the gemstones 106 for imaging and analysis. The arrangement in FIG. 1 may allow for automated alignment of many multiple samples and greatly simplifies the process for the operator, who otherwise would have to load a new gemstone 106 for analysis one at a time, and align the gemstone 106 manually, for each different stone sample.

In the example, many multiple component parts may be included into one overall imaging unit 100. This unit 100 may include a camera arrangement (e.g., the camera 115, lens 119, and adjustable aperture 120), a light source 122, a dichroic beam splitter 124, and a gemstone stage 104 with accompanying motors 110. The imagining unit 100 may be stored in a box or other container 102, for example, a light box that shields the gemstone 106 from ambient light. In some examples, additionally or alternatively, the motors 110 may be servo and/or stepper motors, servo motors, AC servo motor, AC induction motor, Piezo motor, Voice coil motor, and/or Actuator or any other kind of electric or other motor capable of moving the stage in the X, Y, and/or Z dimensions 132 and/or rotating 134 about one or multiple axes. In some examples, additionally or alternatively, each of these component parts may be mounted to an overall system frame (not shown) by movable and/or adjustable and/or motorized mounting brackets and joints. In such a way, the X, Y, and Z positions and/or tilt angles (e.g., pitch, roll, and yaw) for each component part (camera 115 and/or stage 104, etc.)

may be moved independently from one another and/or rotated as needed to align, focus, and/or otherwise position the samples 106 for imaging.

Figure 11:
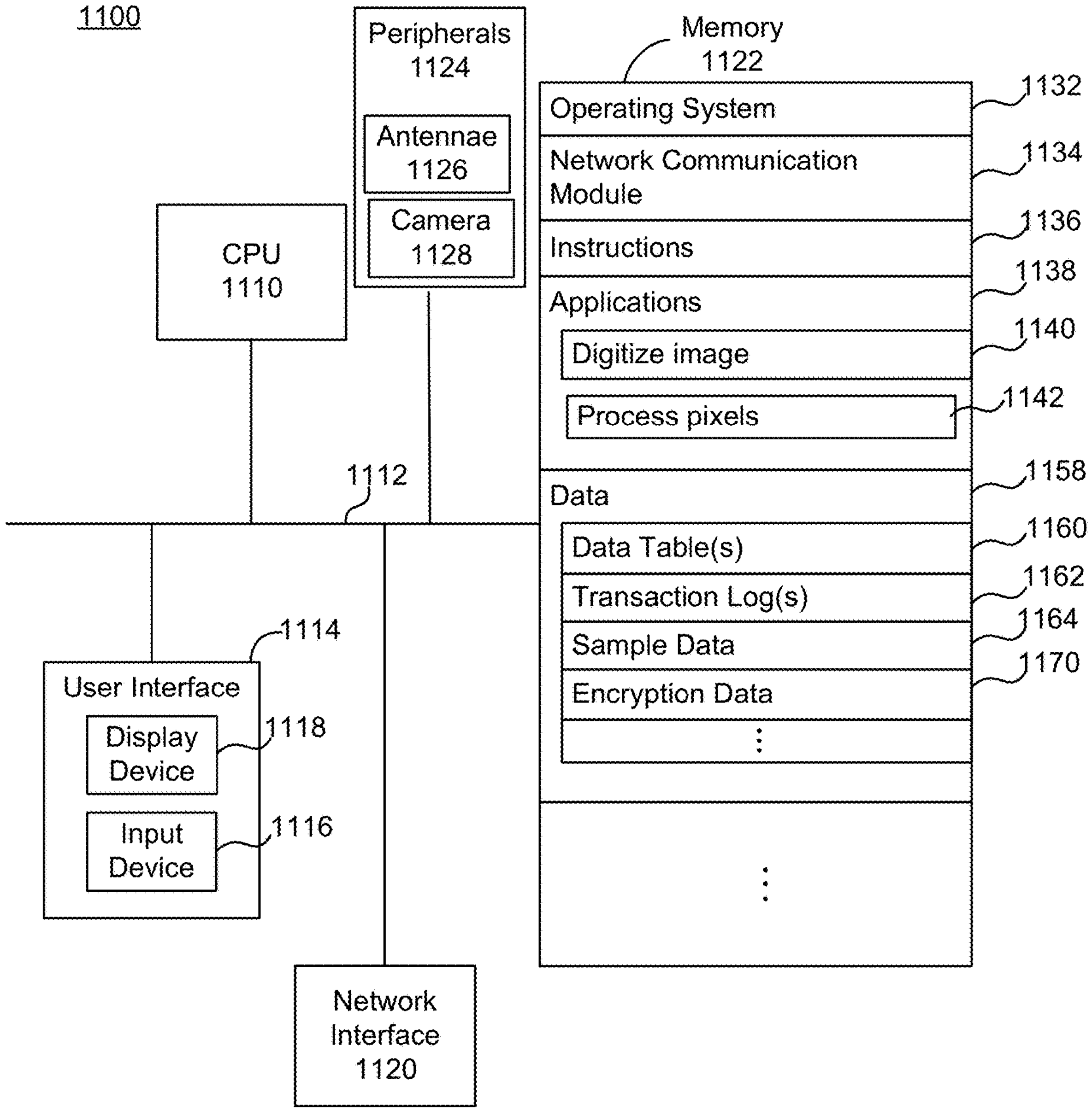
FIG. 11 is a diagram of an example computer system in accordance with certain aspects described herein.

In such examples, each of these component parts (camera 115, adjustable aperture 120, stage 104, beam splitter 124, light source 122, motors 110, etc.) may be in communication with a computer or computer systems such as that described in FIG. 11 (but not shown in FIG. 1). In this way, a single system may house the camera arrangement and movable stage 104 that may be useful in imaging the gemstones 106 as described herein.

The camera 115 may capture image digital data that may be processed by a computing device also in communication with motors 110 on the stage 104 to adjust alignment in X, Y, and/or Z positions of the sample(s) and/or adjust tilt alignment in pitch, roll, and/or yaw as described herein. In some examples, additionally or alternatively, such motors may be in communication with the computing system to create a feedback loop for auto alignment of the samples and auto focus of the cameras using image analysis. In such examples, each motor 110, configured to tilt and/or rotate the stage 104 about the X, Y, and/or Z axes. As the motors 110 may be electric motors, the amount each turns or rotates determines the distance the yaw, pitch, and/or roll occurs. This conversion of rotational distance and motor movement is calculated and used by the computer when it sends commands to the motors as described herein in order to move the stage 104 and thereby the sample gemstone. Such image capture information may be sent to the computing system (not shown) for analysis as described herein. Further, such image data may be utilized to focus the images using Z movement of the stage 104 by the motors 110.

In some examples, additionally or alternatively, the stage 104 may be able to move using translation stepper motors and/or servo motors such that the camera 115 is fixed. In some examples, additionally or alternatively, the camera 115 may be focused on the stage 104 and/or samples 106 to ensure the images captured are clear. This arrangement may allow the system to be pre-aligned to a focus plane and other instruments for analysis (e.g., Raman probes, other spectrometers, or other sensors) may then be positioned so that everything on the stage 104 is in focus as described herein. (See FIGS. 8-9 for additional or alternative focus steps.)

In some examples, additionally or alternatively, the camera 115 may be fixed to a camera mount 112 that positions the camera over the stage 104. The camera mount 112 may include one or multiple motors 111 that may adjust the X, Y, and Z distances and/or tilt angles (e.g., pitch, roll, and yaw) of the camera 115. For example, the X, Y and/or Z distance and/or the pitch, roll, and/or yaw angles of the camera 115 in relation to the stage 104 and/or sample 106 may be adjusted by servo and/or stepper motors for the stage 104 and/or camera 115 mount. In some examples, additionally or alternatively, such adjustments may be made by a computer system in communication with the motors 110, and/or 111 as described herein. In some examples, additionally or alternatively, such motors in communication with the computer system analyzing the camera data may provide a feedback loop that uses image analysis to position the camera 115 and stage 104 as described in more detail in FIG. 2 and FIG. 4.

This camera 115 may then digitally capture the images of the gemstone(s) 106 for alignment as described herein. Such an image may include pixelated data representing the gemstone image as described herein. The cameras 115, may include computer components and may also be in communication with other computer components as described herein for processing the pixelated digital images, for saving, storing, sending, or otherwise aligning or manipulating the pixelated digital images of the gemstone tables.

In some examples, additionally or alternatively, the camera arrangement 115, may be adjustable to adjust focal length, it may be fixed, or removable. In some examples, additionally or alternatively, a light source 122 such as panels fitted with and/or otherwise including Light Emitting Diodes (LEDs) may surround, partially surround, approximate, or be near the stage 104 so as to aid in illuminating the gemstones 106 and aid the camera 115 with image capture for alignment. In some examples, an on-axis diffused light may be used for tilt adjustment as described herein. The light source 122 or auto-focus may be the same light source as for imaging, which is a darkfield light source underneath the sample stage 104.

In such examples, the lighting environment on the stage 104 may help emphasize any color differences of gemstone samples 106. Homogeneous, diffused white light may help reduce any dark areas inside the gemstones in captured images. As such, additionally or alternatively examples here include different configurations of side panels fitted with and/or including LEDs and dark field light 136 as described herein. The dark field light in the example may include LEDs surrounding the PCB board, in some examples it may be six LEDs, which illuminate the gemstone samples with large incident angle. In some examples, different numbers of LEDs may be used in a ring shaped formation. A light blocker may be placed underneath the sample to block any incident light that has small incident angle illuminating the diamond. This dark field light can reveal the outline of the gemstone sample while emphasizing inclusion inside the gemstone. For focusing purpose, alternative lighting environment could be back light or any on-axis diffused light, as long as the lighting environment can reveal the outline of the gemstone. Such a reflector could be any number of panels made of, and/or coated with a light reflective material, such as but not limited to metals such as aluminum, steel, copper, chromium, nickel, and/or any other combination of metals. In such examples, glass mirrors may be used as reflectors. Any combination of reflective materials that are configured to reflect light, such as the light from the light source 122 may be used. These illumination arrangements may allow for as precise color measurements of the samples 106 as possible. In some examples, a diffuser may be placed in front of the light source to diffuse the light.

In some examples, a reflector 138 may be positioned above, and/or below 136 the stage 104. In examples where a reflector 138 is positioned above the stage 104, a hole or other opening may be made in the reflector in order for the camera 115 to view the stage 104 and samples 106. In such examples, the reflector(s) 138, 136 may be made of any light reflecting material and may be positioned such that the light from the light source 122 is reflected toward the stage 104 and samples 106. Any combination of light sources 122 and/or reflectors may be used to illuminate the stage 104 and samples 106. In such examples, a lighting environment with one side LED panel, one bottom LED ring, and both a top and bottom reflector can minimize dark area and emphasize the color differences in the samples.

The beam splitter 124 may be used to create an on-axis diffuse lighting condition. Diffused light 126 coming from LED light source 122 may be partially reflected toward the sample 128. Since 126 is strong enough, a 90% transmission 10% reflection beam splitter may be used as an example. The reflected light 128 may be reflected again by the table 108 of the gemstone 106. The reflected image 130 may then be passed through the beam splitter and captured by the imaging system in an on-axis lighting and image capture arrangement.

It should be noted that the example of LED lights is merely an example and not intended to be limiting in any way. Any number of light arrangements could be used to provide illumination on the stage and samples, LEDs being just one example, alone or in combination such as halogen, fluorescent, incandescent, and/or any other kind or type in any number.

Figure 1B:
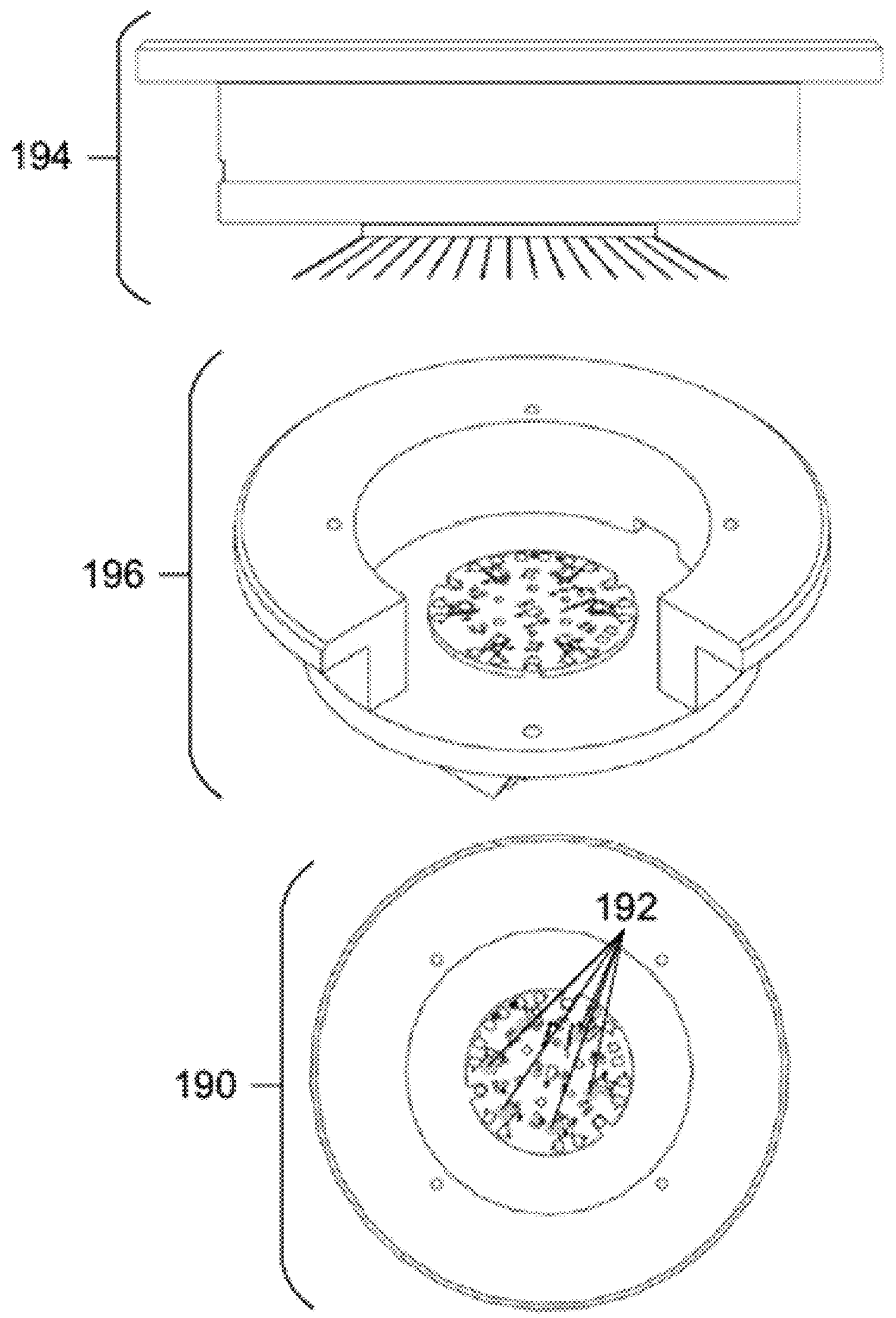

FIG. 1B shows an example dark field light source 190 as used herein with a ring of LED lights 192 shown with a reflector setup 194 atop the light source setup. FIG. 1B also shows a cutaway view of the light source arrangement 196.

Tilt Calibration Examples

To generate consistent gemstone tilt for images for photography, visual evaluation, machine vision, and image processing it is important to align gemstone samples with the cameras imaging the samples. For example, it may be important to align a gemstone sample in the X, Y, and/or Z directions to ensure the sample is within a field of view of the camera. It may also be important to align the gemstone sample so that the table or other surface of the gemstone being imaged is as close to perpendicular as possible to the camera field of view. Positioning the gemstone sample to be perpendicular to the camera may be achieved by adjusting the gemstone sample along one or multiple angles of rotation (e.g., the pitch, roll, and/or yaw axis of rotation). The tilt alignment required to position the surface of the gemstone to be perpendicular with the camera may be calculated to obtain images having an acceptable clarity of the gemstone surface and that capture small features and reflections required to evaluate surface polishing, perform blemish analysis, and conduct other assessments of one or multiple characteristics of the gemstone sample. To determine what is an acceptable tilt alignment for a sample, observations may be made, and then utilized to rotate the stage at a roll and/or pitch angle, for example, a relative angle, or roll or pitch angle between the portion of the sample which is to be analyzed and the camera.

Figure 2A:
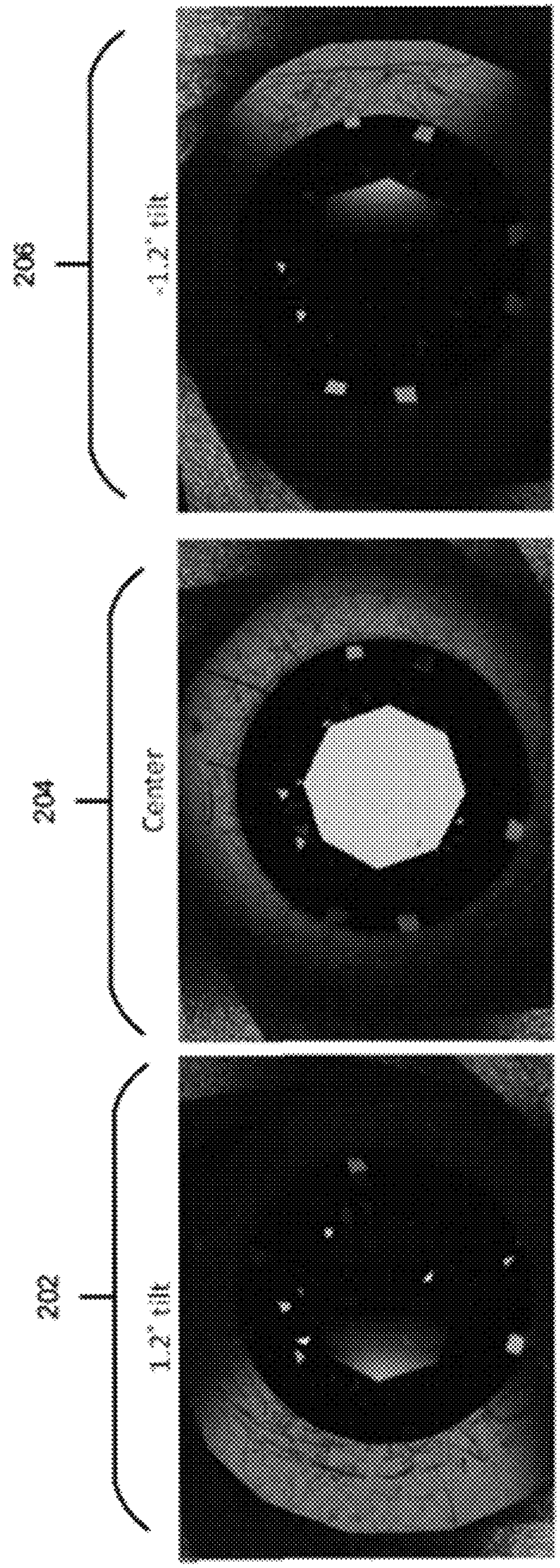
FIG. 2A is an example diagram showing a first set of tilt alignment examples in accordance with certain aspects described herein.

FIG. 2A shows that the system is tilt sensitive. To partially reflect reflectance light, the initial tilt may need to be smaller than 1.2 degrees. FIG. 2 shows this with an example of 1.2 degrees of tilt 202, a centered image 204 and a negative 1.2 degrees of tilt 206. This may be achieved with a greater than 90% success rate. In such examples, the sample holder with an appropriate opening may be required and the acceptable range may need to be determined by the sample table size and camera working distance.

Calibration Examples

For tilt adjustment examples, X, Y, Z coordinates should be fixed because X, Y, Z will also change the beam spot position in cameras field of view. The purpose of calibration is by adjusting roll and pitch (rotation) to align the center of the beam to the center of the camera and define it as perpendicular, or nearly perpendicular. Any other sample surface, which can reflect the beam center back to the same position, can be considered the surface is also perpendicular to the camera.

In some instances, at a first step, it can be determined if a bright spot can be seen. If the bright spot can be seen, a next ideal position can be calculated. If the bright spot is not seen, a first bright spot can be searched by tilt adjustments by way of the motor movements.

Figure 2B:
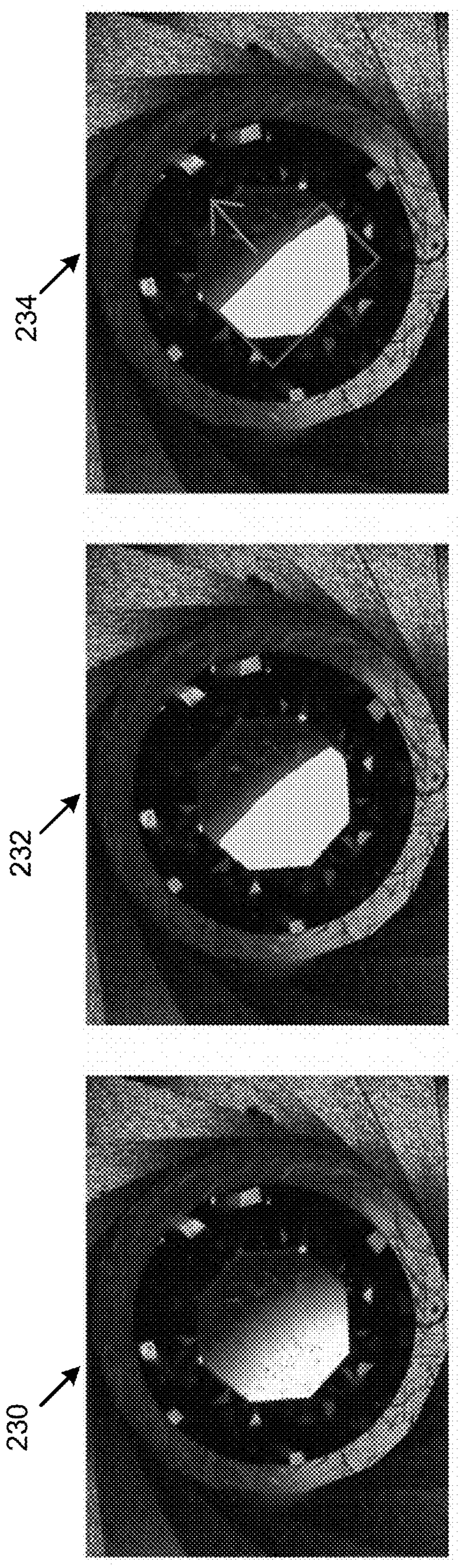
FIG. 2B is an example diagram showing a second set of tilt alignment examples in accordance with certain aspects described herein.

FIG. 2B is an example diagram showing a set of tilt alignment examples in accordance with certain aspects described herein. For instance, as shown in FIG. 2B, a first depiction 230 shows a bright spot being identified by image analysis. Depending on where this bright spot appears on the table, the computer image analysis can determine a direction to move the motors to tilt the gemstone to properly align the gemstone table. Further, in a second depiction 232, the bright spot is masked by the computer imaging and analysis system. In the third depiction 234, the computer image analysis can block out the area, in this example using a rectangular shape that best fits the identified or masked area of the bright spot on the image. The rectangle can be used to identify an angle of the bright spot area and a direction that the gemstone table needs to be moved in order to place the bright spot in the center of the gemstone table. The green arrow in 234 indicates the direction that the computer has determined needs to receive the reflected light to move the bright spot toward the center of the gemstone table. After finding area and angle using the masked area and direction, a next ideal position can be calculated to best place the bright spot in the center of the gemstone table. The computer can command the motors supporting the stage to move a calculated number of rotations, thereby moving the stage as desired and calculated by the computer system.

Figure 9:
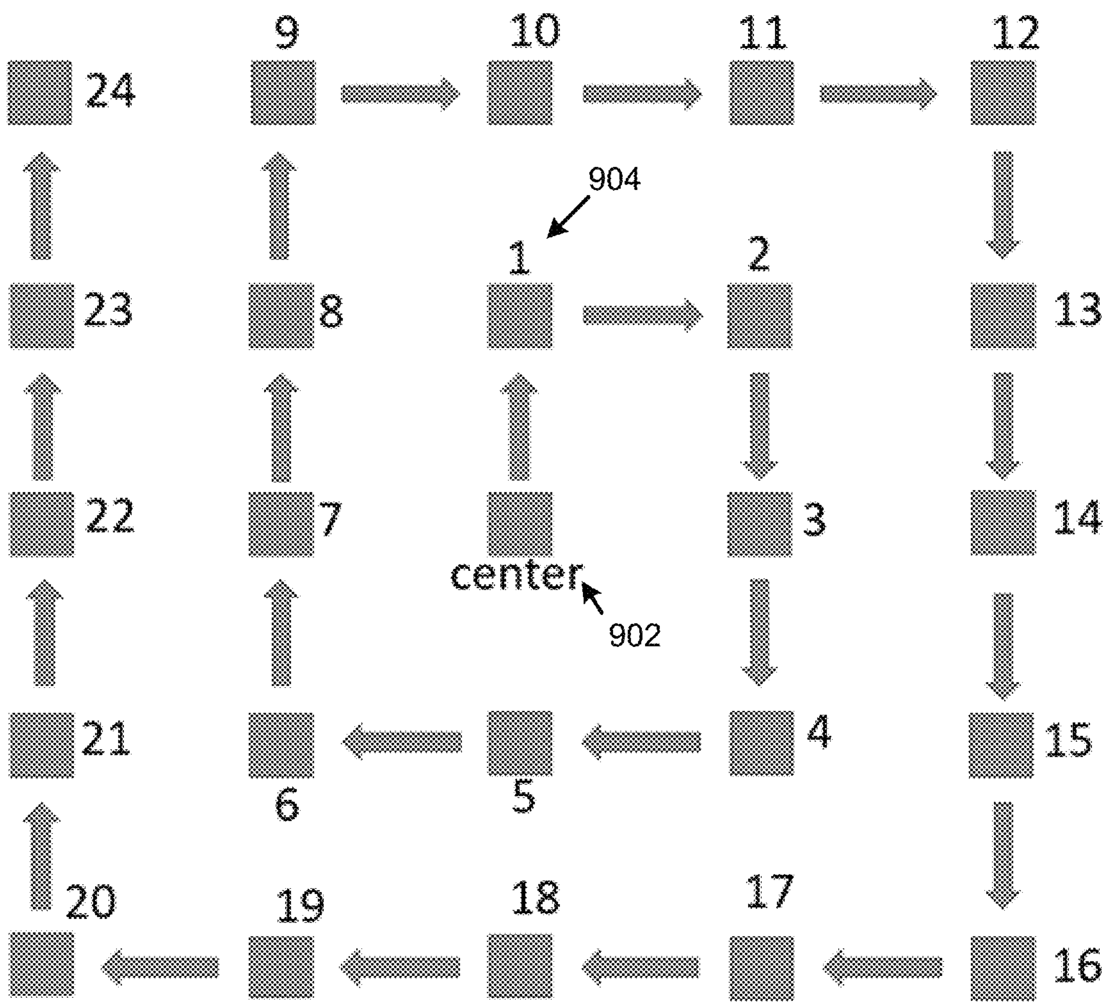
FIG. 9 is an illustration of a number of positions for identifying a bright spot in accordance with certain aspects described herein.

In some instances, if a bright spot is not seen, a motor can be moved between different positions. FIG. 9 is an illustration of a motor being moved between different positions. For example, the motors can move between 24 different positions (e.g., from a center 902 to a first position 904). If a bright spot is detected, the process as described with respect to FIG. 2B can be repeated, for example.

Figure 2C:
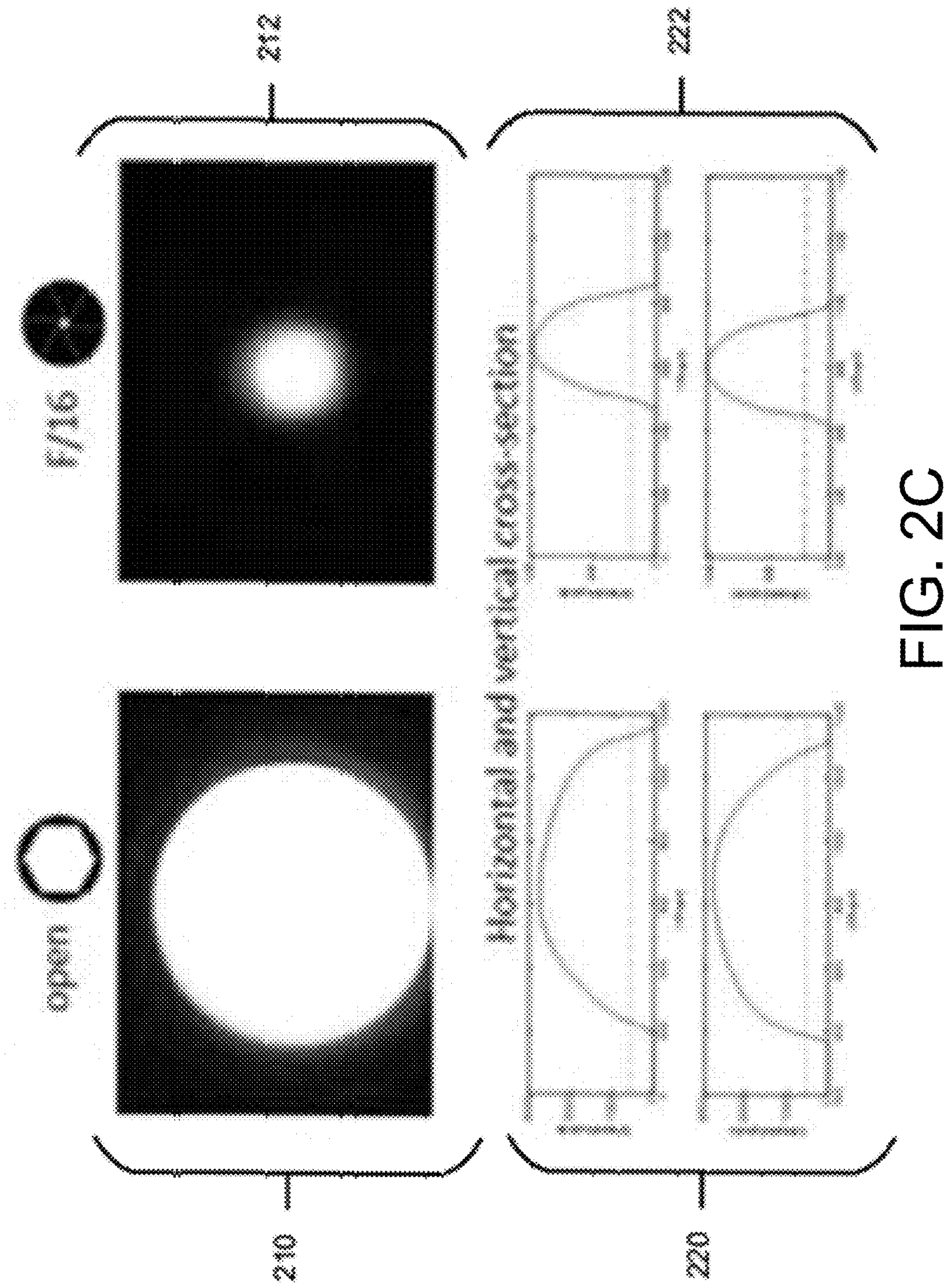
FIG. 2C is an example calibration diagram in accordance with certain aspects described herein.

FIG. 2C shows examples of calibration of the systems and methods here. In some examples, additionally or alternatively, the camera may be calibrated to define a perpendicular plane for the camera. To calibrate the camera for tilt, a flat mirror may be placed on the stage. A definition of perpendicular may be found based on the center of the beam spot calculated from the cross section of from the image. FIG. 2C shows an open aperture 210 and a F/16 212 and associated horizontal and vertical cross sections of the received image light 220, 222 for alignment purposes. The calibration can define the center of the beam spot which should overlap with a certain predetermined pixel in the image. In the example, in FIG. 2C, the center is defined as (840, 800) in the horizontal and vertical cross-sections 220, 222. For the aligned gemstone 204, the table reflection of the octagonal table is clearly visible, but the table reflection is completely obscured in the tilted gemstone 202, 206.

The reflected light that passes through the adjustable aperture may be received by the camera and may define a beam spot within a field of view of the camera. The tilt (i.e., roll and pitch angles) of the mirror may be adjusted by computer command until the beam spot appears within the field of view of the camera when the aperture is fully open. To make this initial adjustment, the stage or camera may automatically rotate to one or multiple different pre-defined roll and pitch angles and the camera may capture an image at each position until the beam spot is detected (e.g., as an area of saturated pixels) within the field of view of the camera. The movement of the rotation of the roll, pitch, and/or yaw angles required to position the beam spot within the center of the field of view may be determined based on the location of the beam spot within the image. The stage and/or camera may then be moved and/or rotated based on the determined directions and/or angles. FIG. 9 includes additional or alternative strategies on initially finding a bright spot.

In some examples, additionally or alternatively, fine adjustments may be made to finish the calibration step. The adjustable aperture may reduce the aperture size and thereby confine the beam spot to a smaller area of the field of view of the camera. In some examples, additionally or alternatively, the adjustable aperture 120 may continuously adjust to reduce the aperture to size to, for example, f/1.4, f/5.6, f/8, f/16, 212, and the like in order to confine the beam spot produced by the reflected light to a smaller area within the field of view of the camera. The camera may capture an image at each aperture size and the fixed X, Y, and/or Z direction and movement of the roll, pitch, and/or yaw angles required to position the beam spot within the center of the field of view may be determined based on the location of the beam spot within each image. The stage and/or camera may then be moved and/or rotated based on the determined directions and/or angles to make the fine adjustments. The beam spot centered in the field of view of a camera with a reduced aperture may then be defined as a reference point for the perpendicular plane. The fixed X, Y, an/or Z positions and movable pitch, yaw, and/or roll angles of the stage and/or camera at the reference point may then be saved as calibration settings. In some examples, additionally or alternatively, the calibration settings may be saved in a calibration file that is stored on the computer system. Before imaging each gemstone sample, the computer system may read the calibration file and move the stage and/or camera to the positions and angles included in the calibration settings. In some examples, additionally or alternatively, the pitch, yaw, and/or roll angles of the initial calibration position of the stage and/or camera may be re-calculated for each new sample.

Tilt Alignment Examples

In some examples, additionally or alternatively, the tilt adjustment of the sample may include a rough adjustment and a fine adjustment. The goal of fine tilt adjustment is to overlap the center of beam spot to the pre-defined center pixel (shown in FIG. 2C as (840, 800)). For rough alignment, the goal is to ensure the flat surface can reflect maximum amount of bright area. The rough adjustment may be used to reduce the aperture size and then overlap the center of beam spot with the defined center in finer and finer increments 212 in FIG. 2C.

To perform the rough adjustment, the adjustable aperture 210 may be fully opened. To make this rough adjustment, the stage or camera may automatically rotate to one or multiple different pre-defined roll and/or pitch angles and the camera may capture an image at each position until a reflection is detected (e.g., as an area of saturated pixels) on a portion of the table of the gemstone sample. No movement of the X, Y, and/or Z direction may be made while the roll, pitch, and/or yaw angles are moved during tilt adjustment. The stage and/or camera may then be moved and/or rotated based on the determined directions and/or angles. In some examples, this stage and/or camera movement may be automated by the computer using feedback loops of analysis of the images received of the gemstone to achieve a desired image.

Figure 3:
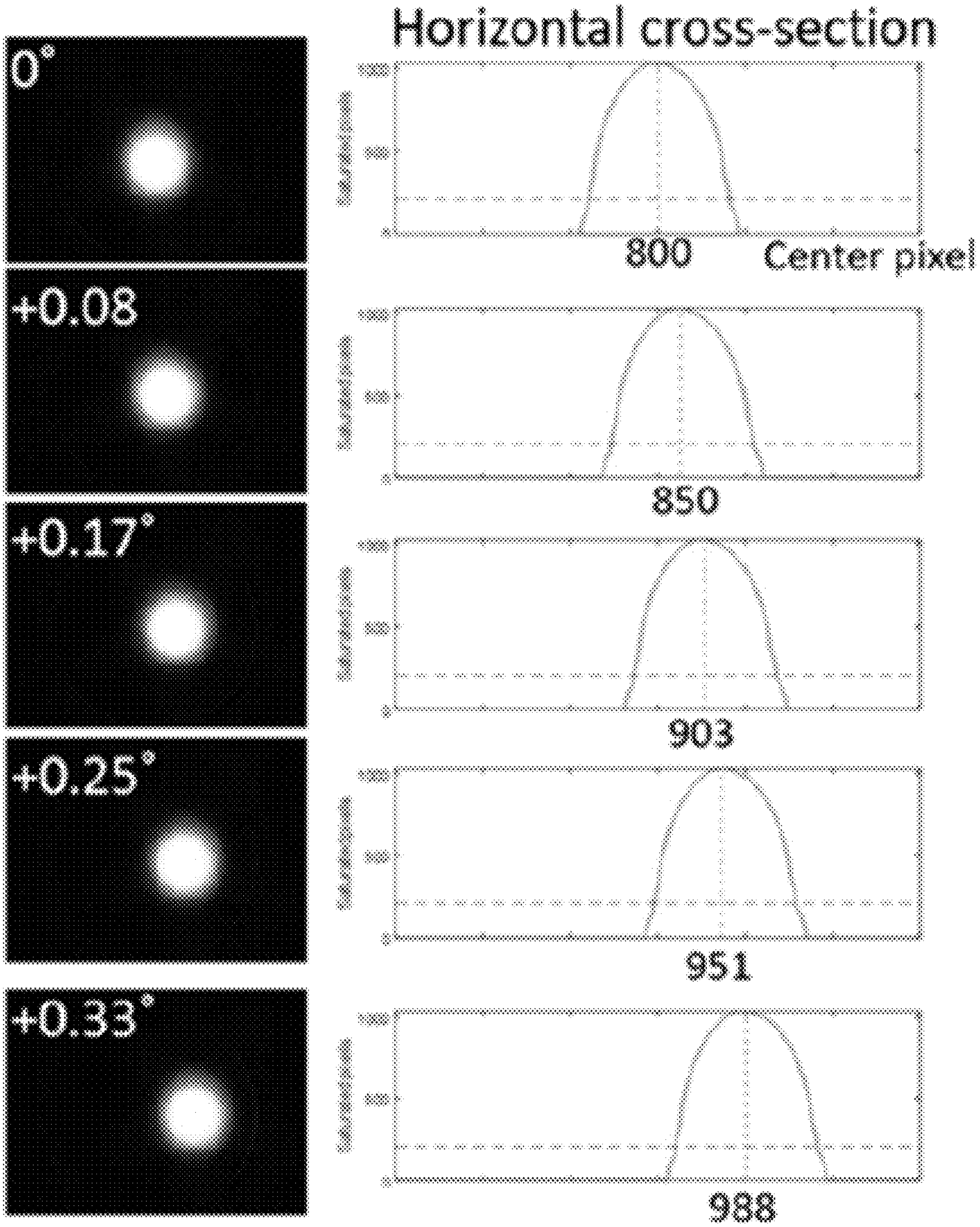
FIG. 3 is an example chart showing alignment examples having different amounts of tilt in accordance with certain aspects described herein.

In some examples, additionally or alternatively, the rough adjustment aspect of the tilt adjustment may adjust the tilt of the sample to make the entire table of the gemstone sample reflect the indecent light. As shown in FIG. 3, the adjustment of the gemstone sample may be determined based on the distribution of saturated pixels across a horizontal cross section of the field of view of the camera by the computer analyzing images of the gemstone. To determine the amount of tilt adjustment required to illuminate the entire table of the gemstone sample, the center pixel of the portion of the field of view of the camera that is saturated with light may be determined be calculating the pixel in the X direction having the maximum saturation. The Y axis in the figure is the number of pixels which are above the threshold in the image. The pixel shift equal to a number of pixels between the center pixel of the partially reflected portion of the tilted sample and the center pixel of the camera field of view may then be calculated to determine the amount of tilting adjustment required to illuminate the entire table of the gemstone. A conversion factor may then be applied by the computer to the calculated pixel shift to determine the degrees of tilt adjustment required to align the gemstone sample.

For example, for a camera field of view measuring 1600 pixels in the X direction, the center pixel of the camera field of view may be pixel 800. The center pixel of a partially reflected portion of a tilted sample may be pixel 988. Accordingly, the pixel shift measuring the difference between the center pixel of the tilted sample and the center pixel of the camera field of view may be 188 pixels. A conversion factor of 57 pixels per 0.1 degree (i.e., 0.1°) of tilt may be applied to a pixel shift of 188 pixels to determine the degrees of tilt adjustment required to align the sample. Accordingly, 0.33 degrees (i.e., 0.33°) of tilt adjustment may be required to align the gemstone sample so that the entire table surface is illuminated. In some examples, additionally or alternatively, the conversion factor may be generated based on the working distance and the field of view of the camera.

This factor can be measured directly or be determined by calculation. In measurement, it may be determined by tilting the stage by a certain predetermined number of degrees and measuring how many pixel shifts were caused in the image by tilting.

For determining by calculation, the following equation may be used to calculate the shift:

tan(2*degree)*working distance/detector pixel pitch

For example, 0.1 degree tilt, working distance 203 mm, detector pixel pitch 3.45 μm tan(0.2)*203*1000/3.45=111 pixels In some examples, additionally or alternatively, the computer system may generate the pixel distribution graphs based on the images captured by the camera. The computer system may also determine the pixel shift and degrees of tilt adjustment based on the pixel distributions. The computer system may also instruct the motors attached to the stage and/or camera to automatically rotate the determined number of degrees of tilt adjustment to align the gemstone sample. In such examples, when the camera is pre-aligned to the pitch and roll axis, any tilt will make the beam spot shifts along its corresponding axis in the image. For example, when the camera X axis is aligned to pitch and camera Y is aligned to roll, any shift in X axis is related to pitch axis and shift in Y is related to in the image can be calculated and get the degree of roll and pitch need to be adjusted. Even if the camera is not perfectly aligned, the conversion can still be calculated by Trigonometric calculations. The rotation of the stage and/or camera may be completed incrementally as shown in FIG. 3 using feedback loops of image analysis by the camera and motor commands sent to the respective motors of the stage and/or camera supports. As shown in the example, the camera may capture an image of the gemstone sample after each incremental movement and the images may be analyzed to determine the alignment progress and confirm the remaining movement required to align the gemstone sample.

In some examples, additionally or alternatively, a fine adjustment may be performed to complete the tilt alignment of the gemstone. The adjustable aperture 120 may be reduced continuously until the diameter of the aperture is less than diameter of the table of the gemstone. For example, additionally or alternatively, the adjustable aperture 120 may contentiously adjust to reduce the aperture to size to, for example, f/1.4, f/5.6, f/8, f/16, and the like in order to confine the beam spot produced by the reflected beam of light 130 to a smaller area that the table of the gemstone. The camera may capture an image at each aperture size and movement of the roll, pitch, and/or yaw angles while X, Y and Z are fixed. In such a movement, the stage may be rotated on a pitch and roll axes to center the beam to the field of view of the digital camera. The stage and/or camera may then be moved and/or rotated based on the determined directions and/or angles to make the fine adjustments. In some examples, additionally or alternatively, the center of the reflected beam 130 reflected off of the table of an aligned gemstone should overlap with the reference point determined during calibration.

In some examples, additionally or alternatively, the computer system may determine the movement of the roll, pitch, and/or yaw angles required for the fine adjustment from the image data and or pixel distribution graphs as described above while X, Y and Z are fixed. The computer system may also instruct the motors attached to the stage and/or camera to automatically move the determined amount of rotation the determined number of degrees of tilt adjustment to align the gemstone sample. The rotation of the stage and/or camera may be completed incrementally as shown in FIG. 3. The camera may capture an image of the gemstone sample after each incremental movement and the images may be analyzed to determine the alignment progress and confirm the remaining movement required to align the gemstone sample.

Focus Adjustment Examples

Figure 4A:
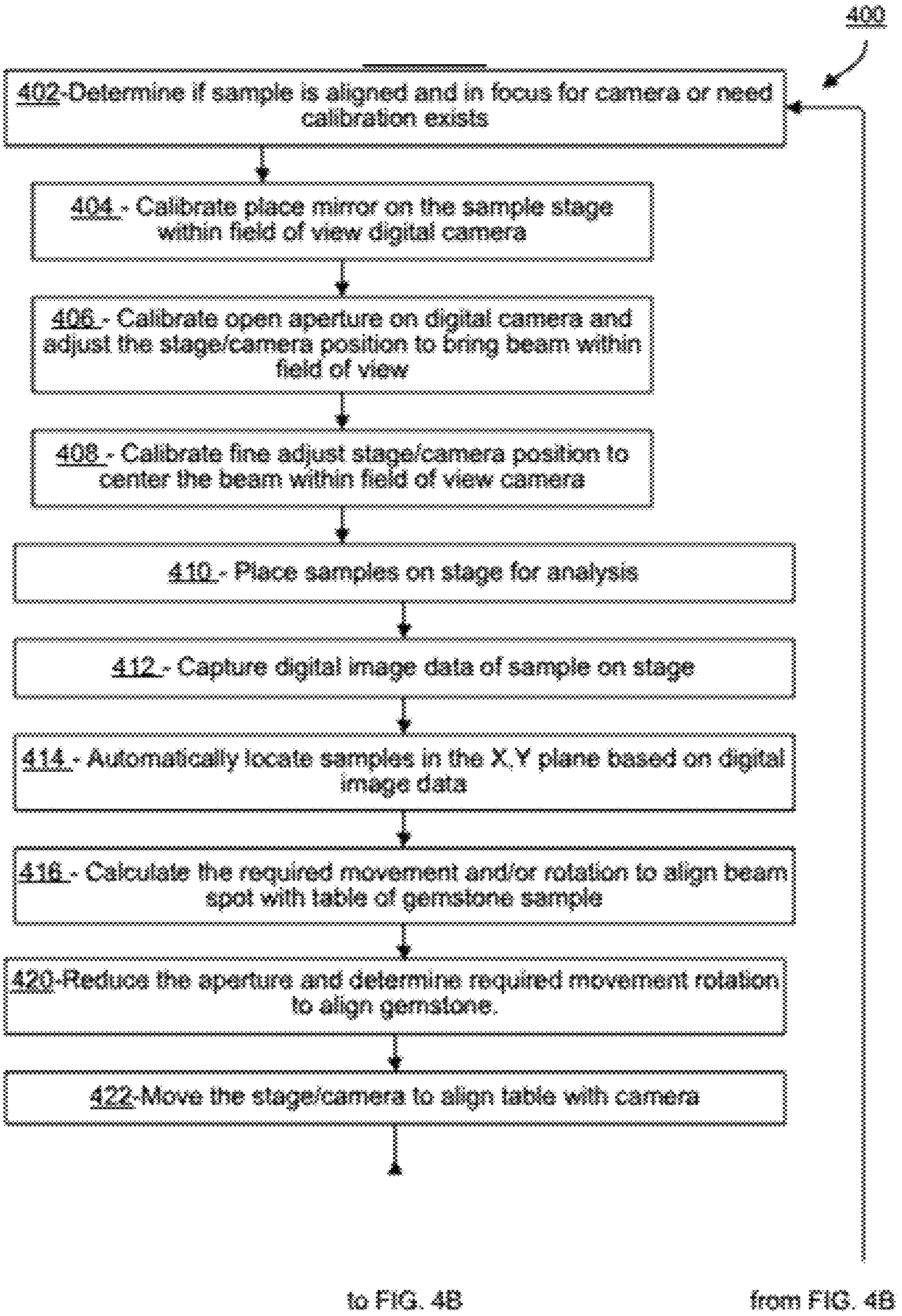
FIGS. 4A and 4B are an example flow chart showing samples of the method steps that may be employed using the systems described herein.
Figure 4B:
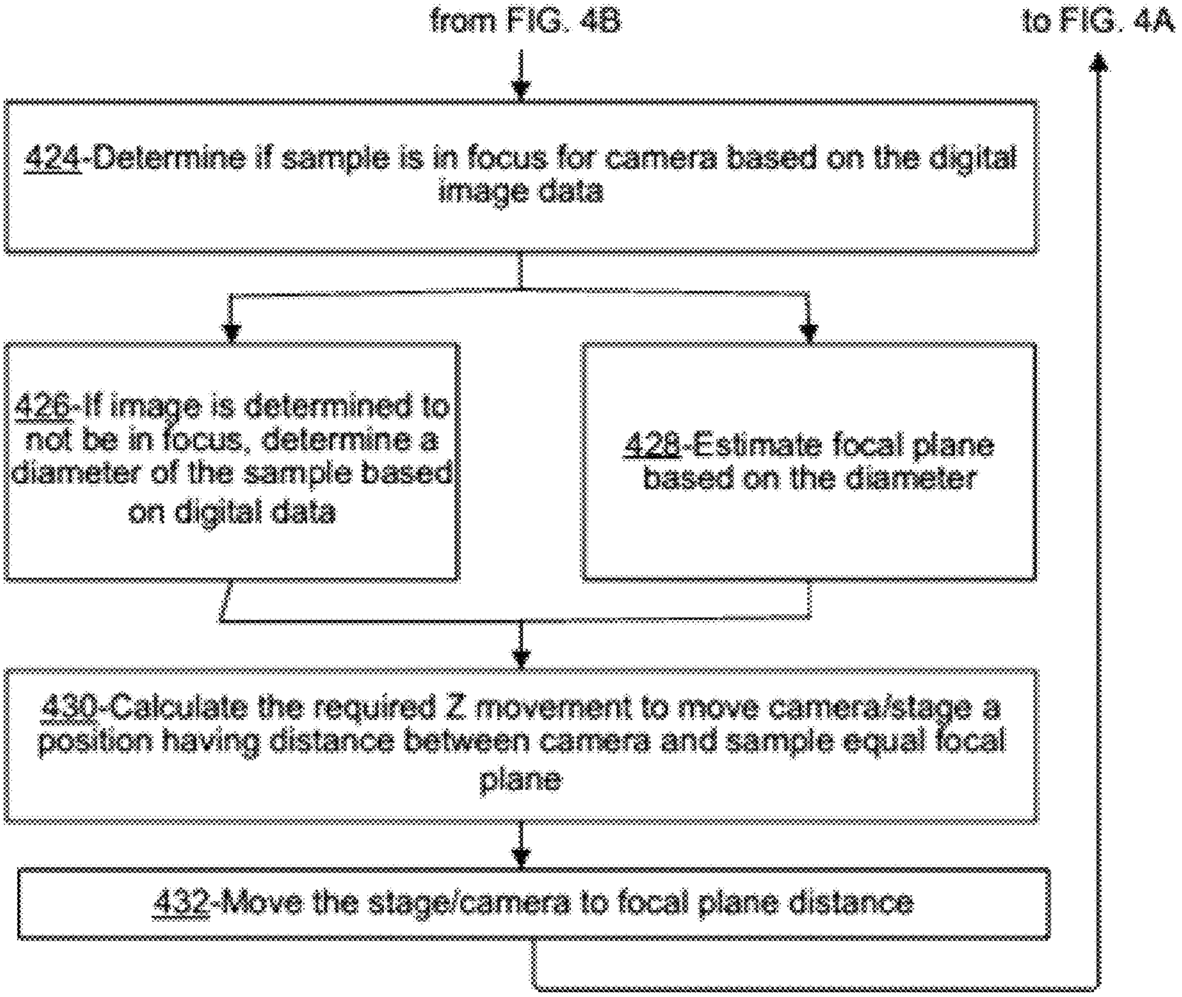

In some examples, additionally or alternatively, to enable consistent imaging of the aligned samples, the Z height of the camera to the sample stage may be adjusted to focus the camera on the gemstone sample. As described in FIG. 5 and FIG. 6 below, in some examples, additionally or alternatively, the depth of the focal plane of the camera may be determined based on the diameter of the table of the gemstone sample. The Z height of the camera in relation to the sample stage that is required to get the gemstone sample to overlap with the focal point of the camera may also be determined based on one or multiple side images of the gemstone sample. Techniques for auto focusing are described in more detail below and FIG. 4A and FIG. 4B provide method examples of the auto tilt alignment and focus adjustment.

The system may utilize calculated dimensions of the sample gemstone in its determination of a focal plane. There are two broad categories of determining such dimensions, a wireframe set of dimensions input from some source or determined by the system, and an image based calculation.

Wireframe data may provide required parameters for focal plane calculation, including diameter, total depth, crown height and pavilion angle as output values. The holder diameter may also be a known value. Such analysis may use crown height, total depth, pavilion angle to calculate where to focus on the sample gemstone.

Such example wireframe data would provide diameter, total depth and crown height as output values. Wireframe data, in this example would need to be provided by other instrument and fed into the system and/or determined by a wireframe silhouette method. The focal plane that overlaps with an area of the gemstone between the table and the girdle may be determined from one or multiple characteristics of the gemstone, holder, and/or stage and/or one or multiple parameters extracted from the wireframe data. For example, the focal plane 608 (D) can be calculated based on the total depth 600 (Ht), the height of the gemstone holder 604 (h), and the crown height 602 (Hc); e.g., based on the following equation 2:

$$D=Ht-h-0.5*Hc$$

$$h=W/(2*\tan(90-\alpha_p)$$

Figure 5:
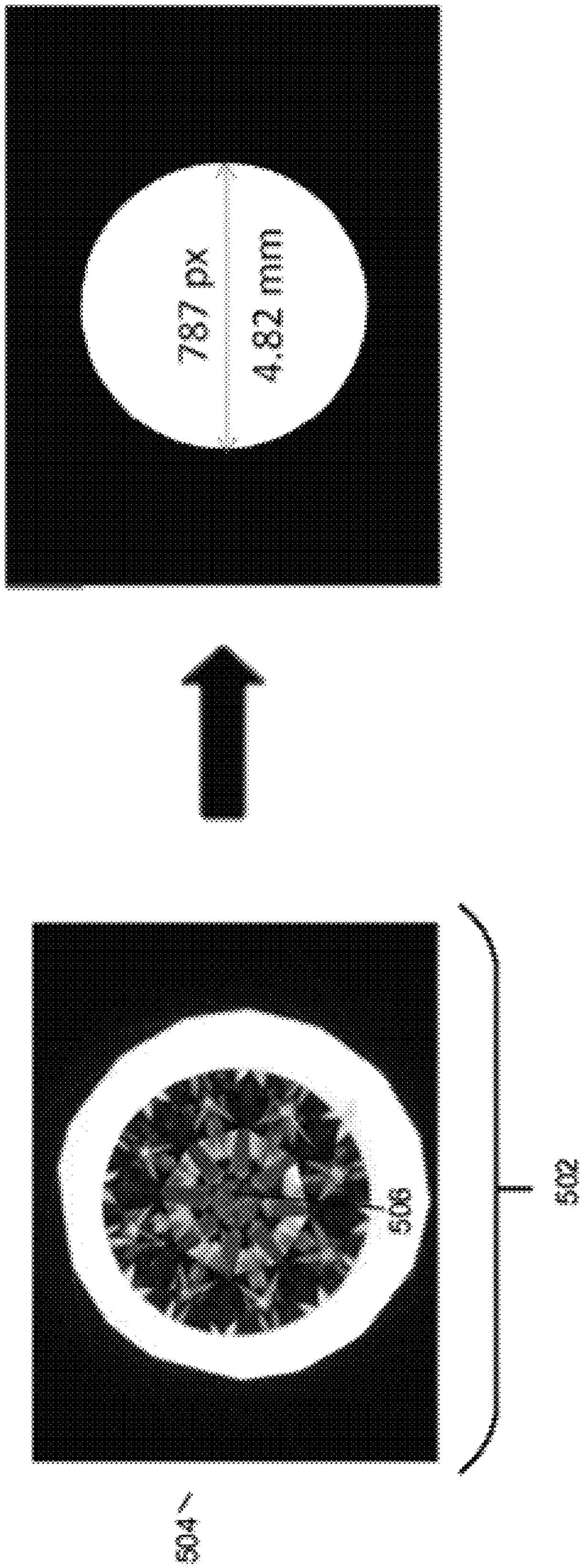
FIG. 5 is an illustration of an example diameter calculation step for focus adjustment in accordance with certain aspects described herein.

But, in situations where obtaining actual wireframe data is challenging, using a captured image can also predict the focal plane. FIG. 5 shows an example of an image capture used to determine gemstone diameter from top view camera. The top view image capture 502 may be captured with a mask 504 from the outline of the gemstone 506. The calculation of diameter may be counted by pixels to convert to actual size.

For example, the pixel size and the magnification; e.g., based on the following equation 1:

$$\text{Diameter}=\text{width in pixels}*\text{pixel size}/\text{magnification}$$

The example in FIG. 5 shows 1 pixel=3.45/0.563=6.128 um $$\text{Diameter}=787*6.128=4.823\text{ um}$$

This may be used to determine the focal plane by estimation, and not using side camera. Based on measured diameter, the average crown height, average total depth, average pavilion angle may be used to calculate the focal plane. Using a captured image plus the known average crown height, average total depth, average pavilion angle may be used to calculate the focal plane. Since all diamonds, especially round brilliant diamonds are cut based on similar aspect ratio, the actual values are very similar to the average value.

Figure 6:
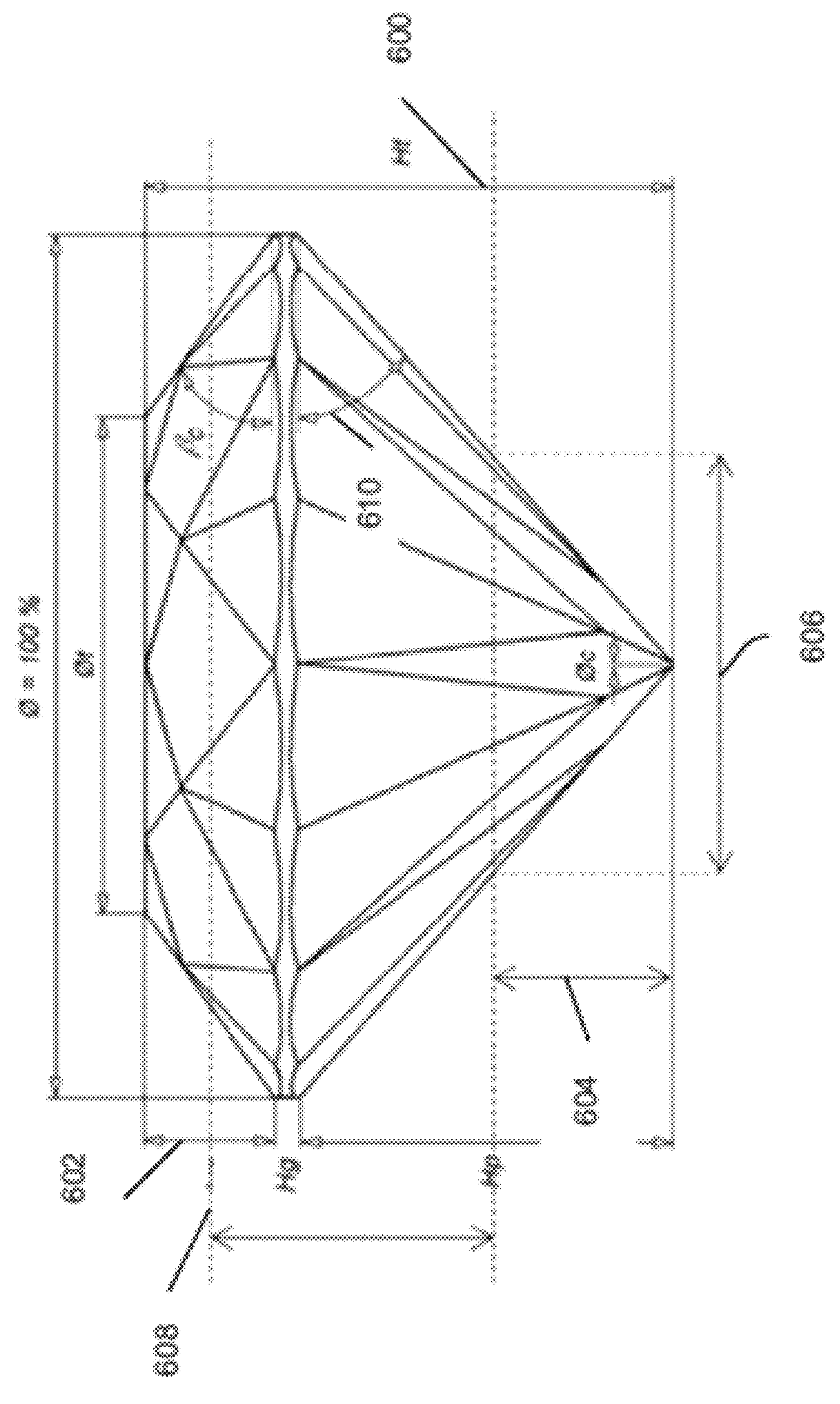
FIG. 6 is an example diagram explaining a sample focal plane calculation in accordance with certain aspects described herein.

FIG. 6 illustrates the locations of each of the components of the equation for determining the focal plane of a round brilliant cut diamond. As shown in FIG. 6, the focal plane 608 (D) is the distance above the stage, the holder diameter 606 (W) is 2.5 mm, the pavilion angle 610 ($\alpha_p$) is approximately 42°. The total depth 600 (Ht) may be approximately 62% of the diameter of the gemstone and the crown height 602 (Hc) may be approximately 15% of the diameter of the gemstone. In some examples, additionally or alternatively, the pavilion angle, total depth, and crown height may be estimated from measurements taken of multiple gemstone samples. For example, the pavilion angle, total depth, and crown height may be estimated based on the average values for each of the parameters measured for 30,000 or more gemstone samples. The values used to estimate the pavilion angle, total depth, and crown height may be measured manually of automatically based on computer vision or other image processing techniques. For example, the pavilion angle, total depth, and crown height may be calculated using wireframe data. The focal plane 608 (D) for focusing the camera on the gemstone sample may be estimated based on the diameter ($\varphi$) using the following equation 3:

$$D=0.54\varphi-2.5/(2*\tan(48°))$$

The focal plane 608 (D) for focusing the camera on the gemstone sample may be estimated based on the wire frame data using the following equation 4:

$$D=Ht-2.5/(2*\tan(90-\alpha_p))-0.5*Hc$$

The Z height of the camera may be adjusted to make the actual distance between the camera and the gemstone equal to the focal plane.

In some examples, additionally or alternatively, the computer system may determine the diameter of the gemstone sample based on the image data. The computer system may also calculate the focal plane based on the diameter and the wireframe data. The computer system may also determine the Z movement required to overlap the focal point of the camera with the gemstone. The computer system may also instruct the motors attached to the stage and/or camera to automatically move the determined amount Z direction to focus the gemstone sample.

In some examples, additionally or alternatively, a side viewing camera may also be used to focus the gemstone sample. To use the side viewing camera for focusing, the gemstone sample may be placed between the light source and the camera. At this position, the gemstone blocks the light received by the camera and creates a dark image that shows the outline of the sample in black against a bright background. The dark image may be processed to determine the focal plane. For example, the number of pixels from the focal plane at the current camera Z height to the sample stage may be determined. The number of pixels from the ideal focal plane (i.e., a height of the area between the table and the girdle of the gemstone) and the current focal plane may then be determined from the dark image. The number of pixels separating the current focal plane from the ideal focal plane may be converted into an actual distance based on the parameters of the image and/or camera. For example, the pixel size and the magnification; e.g., based on the following equation 5:

$$Z\ \text{distance}=\text{height in pixels}*\text{pixel size}/\text{magnification}$$

The camera and/or stage may be moved the determined amount of Z distance to focus the camera on the gemstone sample.

In some examples, additionally or alternatively, the computer system may determine the location of the table and the height of the gemstone based on the dark image. The computer system may also determine the height difference in pixels between the current focal plane and the ideal focal plane and calculate the Z distance required to overlap the focal point of the camera with the gemstone based height difference. The computer system may also instruct the motors attached to the stage and/or camera to automatically move the determined Z distance to focus the gemstone sample.

Process Step Examples

FIGS. 4A and 4B depict an example flow chart of example steps that may be used for aligning and focusing the gemstone sample using the systems and methods described herein. In the process, the first step is for the system to determine if a sample is aligned and in focus for the camera, if not, then the system may need to calibrate 402. The calibration 402 does not have to be performed every time. One initial calibration may be required before a measurement, depending on the status of the systems. The calibration may be done before placing the sample, for example 404 to 408 before 402. In the example XYZ are fixed and the stage may be rotated on a pitch and roll axes to center the beam to the field of view of the digital camera in 408. Also, side light 122 may be turned on for tilt calibration and adjustment. If calibration is unnecessary, the system may skip calibration steps and proceed with the first alignment of the sample step 410.

The tilt calibration may use a flat mirror that reflects an incident beam toward an adjustable aperture 404. Next to calibrate, the adjustable aperture may be opened and the position of the digital camera or stage may be adjusted to bring the reflected beam reflected off of the mirror into the field of view of the camera 406. Next to calibrate, the adjustable aperture may be reduced to confine the reflected beam to a smaller area and the position of the stage and/or camera may be adjusted to center the confined beam within the field of view of the camera 408. In some examples, additionally or alternatively, the tilt calibration may be determined using a tilt adjustment feedback loop between the camera image and computer analysis of the image to determine the amount of the roll, pitch, and/or yaw rotation required to center the reflected beam in the camera field of view while X, Y and Z remain fixed.

Once calibration is complete, or having already been calibrated, the gemstone samples may be placed on the stage for analysis 410. Next, the system may capture a pixelated image or other digital image data of each sample 412. Next, the system may automatically locate the samples in the X, Y plane based on the digital image data as described above 414. Next, the system may determine the required movement in the angle of pitch, yaw, and/or roll rotation required to align the beam spot with the table of the gemstone sample so that a portion of the table of the gemstone is illuminated within the camera field of view 416 while X, Y and Z remain fixed. Next, the stage or the camera is moved the determined amount of movement or rotation to bring the portion of the table illuminated by the reflected beam within the camera field of view. Next, the adjustable aperture may be reduced and the movement in the angle of pitch, yaw, and/or roll rotation required to align the gemstone with the camera so that the entire surface of the table is illuminated by the reflected beam may be determined 420. Next, the stage or camera may be tilted to align the table of the gemstone sample with the adjustable aperture so that the illuminated table appears within the center of the field of view of the camera and the tilt of the gemstone is aligned with the camera 422.

In the example, the side light 122 may be turned off, and the dark field light 136 turned on before focusing adjustment. The Z height distance between the camera and stage may also be adjusted to overlap the focal point of the camera with the gemstone sample. Before the focus is adjusted, the system may determine if the sample is in focus for the camera based on digital image data of the sample captured by the camera 424. If the sample is not in focus, the focus may be adjusted. To focus the gemstone sample for the camera, the system may determine a diameter of the sample based on the digital image data 426 as described above for FIG. 5 and FIG. 6. Alternatively, the system may estimate the focal plane based on the diameter or wireframe data for the sample 428. Next, the system may calculate the required Z movement to move the camera or stage to a position having a distance between the camera and the sample that is equal to the focal plane 430. Next, the system may focus the camera on the gemstone by moving the stage or the camera to a distance from the sample that causes a focal point of the camera to overlap with the sample 432. As explained, moving the stage or camera may include transmitting computer instruction to an electric motor such as but not limited to stepper motors, servo motors, AC servo motor, AC induction motor, Piezo motor, Voice coil motor, and/or Actuator or any other kind of electric or other motor capable of rotating or moving the stage or the camera.

In some examples, additionally or alternatively, the system may revert back to the first step to determine if a next sample is perpendicular, or nearly perpendicular to the camera and in focus for the camera, if not, then calibrate 402 to continue with the steps as described.

In such a way, the system may automatically, using captured image data, computer analysis and method steps, align the tilt of the sample gemstone with the camera and focus the camera on the sample without need for human interaction or input, or use little human interaction or input.

Table Reflection Examples

Figure 7:
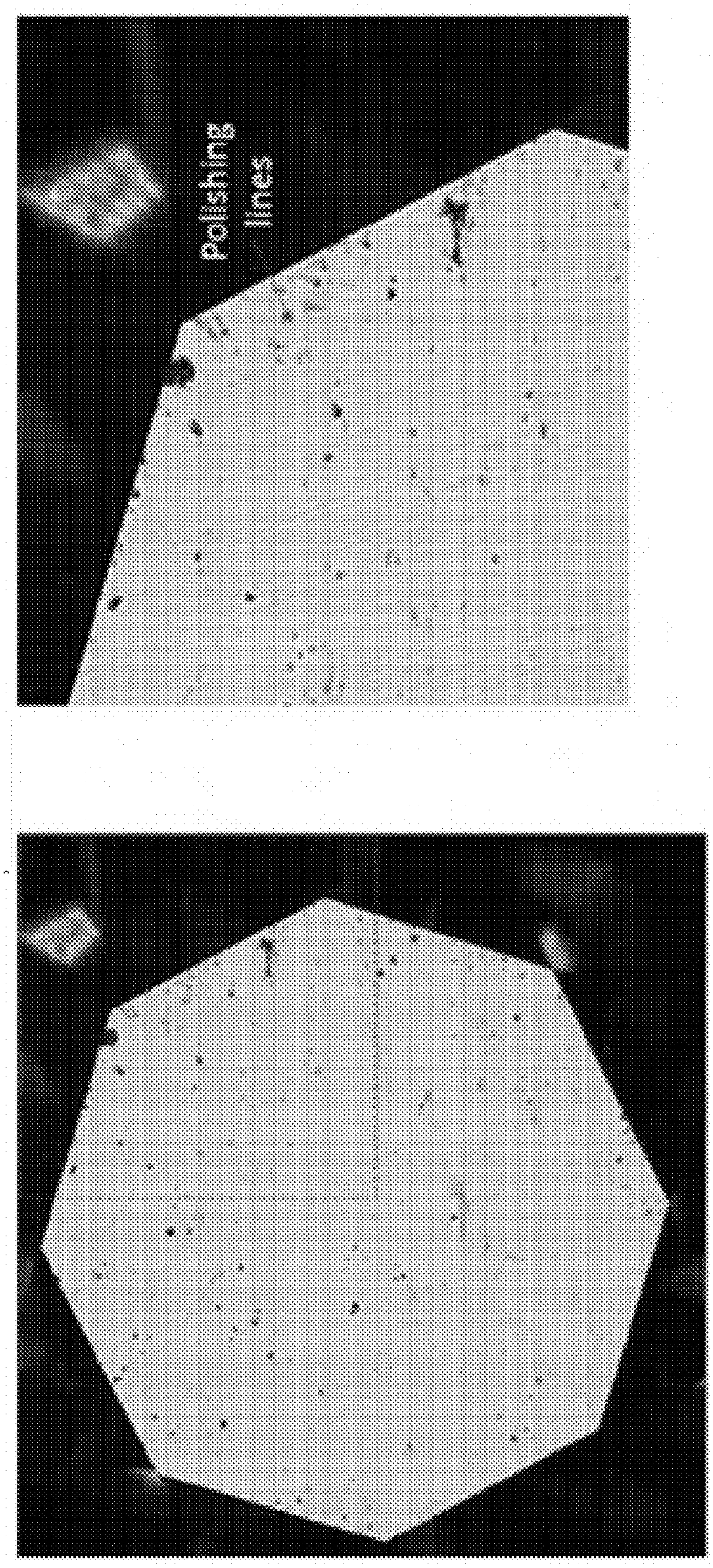
FIG. 7 is an illustration of surface features that may be viewed using the systems described herein.

In some examples, surface analysis can measure all facets of a gemstone except the table, and the systems and methods described here are then able to measure the table. In some examples, additionally or alternatively, aligning and focusing the gemstone for the camera by enable one or multiple features of the gemstone to become visible. For example, the table reflection of the gemstone shown in FIG. 7 may become visible when the camera should be focused onto the table of the gemstone, is aligned and in focus for the camera. The table reflection may appear as a bright illumination of the table surface (e.g., an octagonal table of a gemstone) against a dark background. The table reflection may reveal features of the table that are impossible to see with the naked eye. For example, polishing lines and other blemishes or imperfections on the table of the gemstone may be seen in the table reflection.

When the gemstone table is overlapped with the focal plane of the camera, the cross-section will have the maxima contrast and/or has the maxima slope of the edge of the cross-section for edge detection. This can be used as a reference for other focusing purposes, for example, move ½ Hc or 0.075φ below the table height may be a useful focal plane for gemstone imaging.

Figure 8:
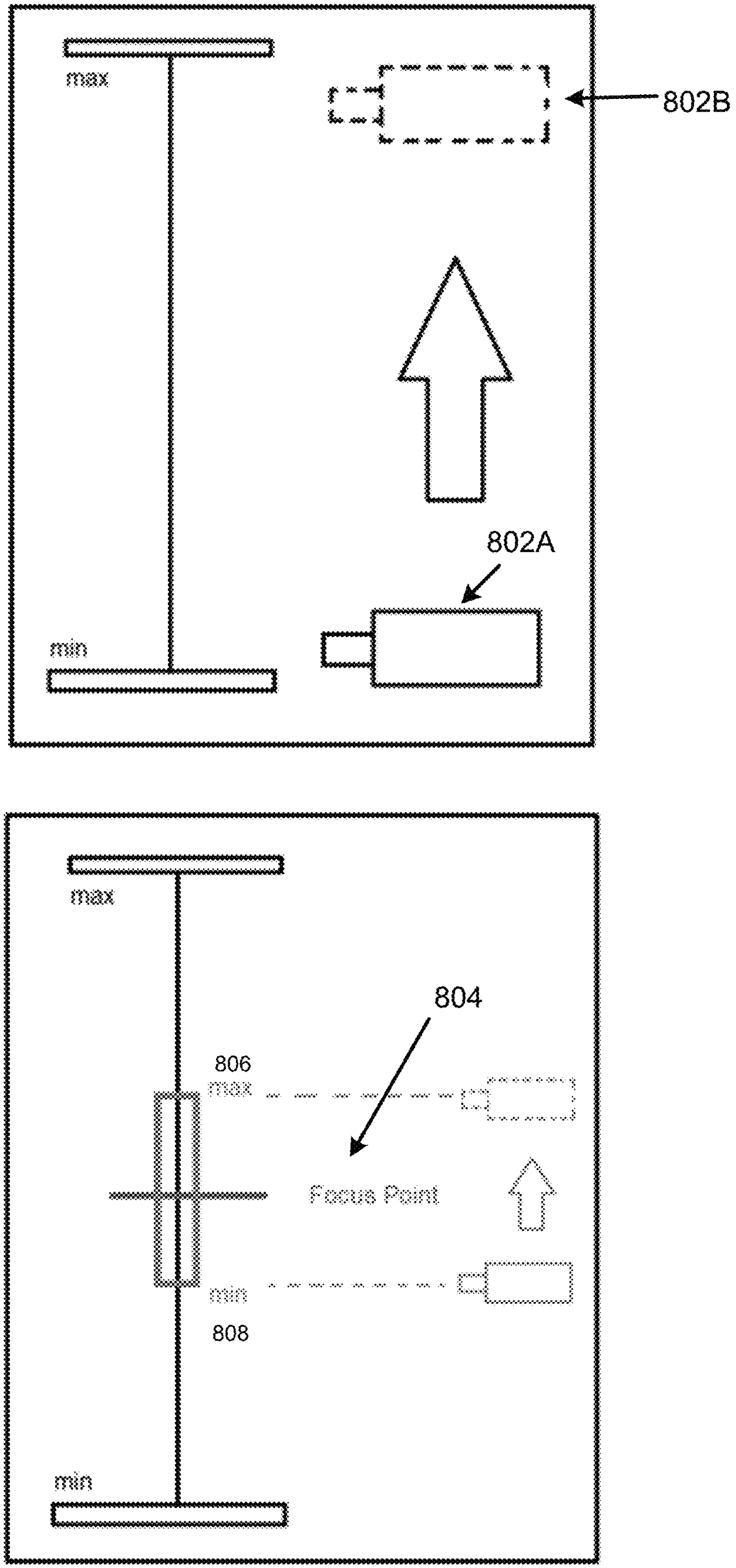
FIG. 8 is an illustration of auto-focusing a camera in any of the systems as described herein.

In some instances, a clarity measurement instrument can be auto-focused as discussed herein. Such an auto focus may be useful in automating the system to capture focused images without use of manual intervention to find a distance to focus the camera system on a gemstone table as described. FIG. 8 illustrates an example process for a camera to auto-focus to find a focus point 804 of a gemstone table. For instance, a camera can be moved using motors as described herein, between a min level and a max level 802A-B. This initial scan along a larger distance may need to be narrowed after a better range of focused images is first captured. The camera can also capture images and store the images to determine which are out of focus and which are in focus, and correlate the camera position with the corresponding image and focus result. A focus value can be calculated from each image to narrow down the broad range of min to max of a rough focus height.

A new, narrower scan area can be selected by the computer system, based on the rough focus point data and image analysis. To find a more sensitive focus point, the camera can be moved between new, narrower max 806 and min 808 height levels within the new scan area while capturing images and storing the images. Focus values can be calculated form the second set of scanned images to find a more specific and clear focus point 804.

Network Examples

Figure 10:
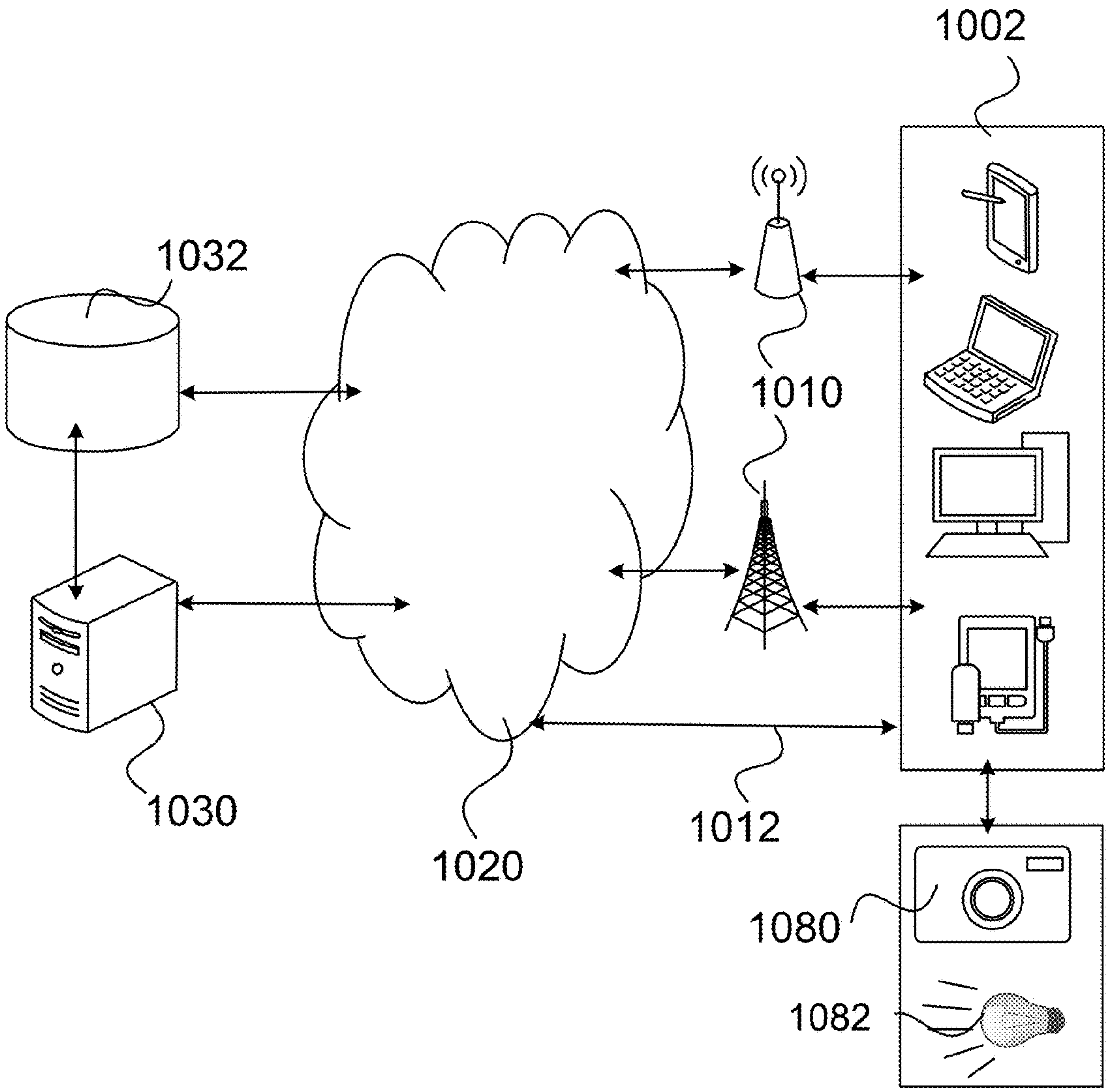
FIG. 10 is a diagram of an example networked system in accordance with certain aspects described herein.

Systems and methods here may utilize a networked computing arrangement as shown in FIG. 10. In FIG. 10, a computer 1002 may be used to process the pixel data of the captured images of the camera 1080, send and receive instructions to the stage motors (not shown), or send and receive other data such as sample location, wireframe data of gemstones, identification information of the gemstones, time and date, etc. Peripheral components such as cameras 1080 and lights 1082 may be in communication with the computer systems 1002. These cameras 1080 and/or lights 1082 may be used to illuminate gemstones and capture images as described herein. The computer systems 1002 may send commands to the peripherals 1080, 1082 and receive captured image data from any camera systems 1080 for analysis and decision making as described herein. The computer 1002 used for these steps could be any number of kinds of computers such as those included in the camera itself, and/or another computer arrangement in communication with the camera computer components including but not limited to a laptop, desktop, tablet, phablet, smartphone, or any other kind of device used to process and transmit digitized data. More examples are described in FIG. 11.

Turning back to FIG. 10, the data captured for the pixelated image, calibration file, stone sample identifying information, location, and/or sample tilt from whichever computer 1002 may be analyzed on a back-end system instead of or in addition to a local computer. In such examples, data may be transmitted to a back-end computer 1030 and associated data storage 1032 for saving, analysis, computation, comparison, or other manipulation. In some examples, additionally or alternatively, the transmission of data may be wireless 1010 by a cellular or Wi-Fi transmission with associated routers and hubs. In some examples, additionally or alternatively, the transmission may be through a wired connection 1012. In some examples, additionally or alternatively, the transmission may be through a network such as the internet 1020 to the back-end server computer 1030 and associated data storage 1032. At the back-end server computer 1030 and associated data storage 1032, the pixelated image data, calibration file, sample identification, sample location, time, date, and/or sample tilt may be stored, analyzed, compared to previously stored image data and/or wireframe data for matching, identification, and/or any other kind of data analysis. In some examples, additionally or alternatively, the storing, analyzing, and/or processing of data may be accomplished at the computer 1002 which is involved in the original image capture and/or data collection. In some examples, additionally or alternatively, the data storing, analyzing, and/or processing may be shared between the local computer 1002 and a back end computing system 1030. In such examples, networked computer resources 1030 may allow for more data processing power to be utilized than may be otherwise available at the local computers 1002. In such a way, the processing and/or storage of data may be offloaded to the compute resources that are available. In some examples, additionally or alternatively, the networked computer resources 1030 may be virtual machines in a cloud or distributed infrastructure. In some examples, additionally or alternatively, the networked computer resources 1030 may be spread across many multiple physical or virtual computer resources by a cloud infrastructure. The example of a single computer server 1030 is not intended to be limiting and is only one example of a compute resource that may be utilized by the systems and methods described herein. In some examples, additionally or alternatively, artificial intelligence and/or machine learning may be used to analyze the image data from the samples, align the sample with the camera and/or focus the imaging camera for use with stage movement. Such systems may employ data sets to train algorithms to help produce better and better results of imaging of samples, alignment of samples, analysis of samples, identification of focused samples, stage movement, camera movement, and the like.

Example Computer Devices

FIG. 11 shows an example computing device 1100 which may be used in the systems and methods described herein. In the example computer 1100 a CPU or processor 1110 is in communication by a bus or other communication 1112 with a user interface 1114. The user interface includes an example input device such as a keyboard, mouse, touch-screen, button, joystick, or other user input device(s). The user interface 1114 also includes a display device 1118 such as a screen. The computing device 1100 shown in FIG. 11 also includes a network interface 1120 which is in communication with the CPU 1120 and other components. The network interface 1120 may allow the computing device 1100 to communicate with other computers, databases, networks, user devices, or any other computing capable devices. In some examples, additionally or alternatively, the method of communication may be through WIFI, cellular, Bluetooth Low Energy, wired communication, or any other kind of communication. In some examples, additionally or alternatively, the example computing device 1100 includes peripherals 1124 also in communication with the processor 1110. In some examples, additionally or alternatively, peripherals include stage motors 1126 such as electric servo and/or stepper motors used for moving the stage for the sample analysis. In some examples peripherals 1124 may include camera equipment 1128. In some examples, peripherals 1124 may include stage motors and camera motors (not shown). In some examples computing device 1100 a memory 1122 is in communication with the processor 1110. In some examples, additionally or alternatively, this memory 1122 may include instructions to execute software such as an operating system 1132, network communications module 1134, other instructions 1136, applications 1138, applications to digitize images 1140, applications to process image pixels 1142, data storage 1158, data such as data tables 1160, transaction logs 1162, sample data 1164, sample location data 1170 or any other kind of data.

CONCLUSION

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the description pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method comprising:

by a computer with a processor and memory, in communication with a digital camera, a motorized adjustable aperture mounted on the digital camera, a light source, and at least one rotation motor to adjust pitch and roll of a stage, sending an instruction to the light source to generate a source of light that is directed toward a surface of the gemstone, wherein the light source is disposed offset from the digital camera and directs the light to a beam splitter to partially reflect the source of light toward the surface of the gemstone;

determining if the gemstone on the stage is aligned with the digital camera, by analyzing a captured digital image of the gemstone taken by the digital camera, if the gemstone is not aligned, by the computer, aligning the gemstone with the digital camera by:

opening the adjustable aperture to receive reflected light reflected from the surface of the gemstone and capturing, by the digital camera, an initial image of the gemstone;

determining a location and a tilt of the gemstone based on the initial image by:

determining a center pixel of an area of saturated pixels in the initial image; and determining a pixel shift that equates to a number of pixels between the center pixel of the area of saturated pixels and a center pixel of a field of view of the digital camera;

sending an instruction to the motor to automatically rotate the stage on at least one of the pitch and roll axis based on the determined pixel shift to align the gemstone with the digital camera so that a table of the gemstone is nearly perpendicular to the digital camera, and the table and a table reflection is visible in a field of view of the digital camera;

automatically reducing the adjustable aperture from an initial width to a reduced width to confine the reflected light to a smaller portion of the field of view of the digital camera; and capturing, by the digital camera, an image of the gemstone that includes the table reflection.

2. The method of claim 1, further comprising performing a surface polishing and blemish analysis for the gemstone based on the image of the gemstone that includes the table reflection.

3. The method of claim 1, wherein the determining the tilt of the gemstone based on the initial image comprises:

generating a distribution of saturated pixels or pixels determined to be above a threshold;

determining the center pixel for the area of saturated pixels in the distribution that corresponds to a partial table reflection of the gemstone; and converting the pixel shift to a number of degrees of tilt.

4. The method of claim 1, further comprising:

reducing the adjustable aperture to confine the reflected light to a smaller portion of the field of view of the digital camera and capturing a second image of the gemstone with the adjustable aperture that comprises the reduced width;

determining a fine adjustment for the tilt of the gemstone based on the second image; and sending instruction to the motor to rotate the stage on at least one of the pitch or roll axis to align the tilt of the gemstone with the digital camera based on the fine adjustment.

5. The method of claim 1, further comprising:

determining if the stage is aligned with the digital camera, by analyzing a captured digital image of a mirror on the stage taken by the digital camera and if the stage is not aligned, by the computer, aligning the stage with the digital camera based on an image of a beam spot produced by a beam of reflected light reflected from a surface on the stage.

6. The method of claim 1, wherein the aligning the stage with the digital camera comprises:

sending instruction to a light source to generate a source beam of light that is directed by a beam splitter toward a surface of a mirrored surface;

opening the adjustable aperture to receive the beam spot and capturing an initial image of the mirrored surface;

determining a location and a tilt of the stage based on the initial image;

sending instruction to the motor to rotate the stage on at least one of the pitch or roll axis to align the tilt of the stage with the digital camera so that a surface of the stage is perpendicular to the digital camera and the beam spot is visible in a field of view of the digital camera;

sending instruction to the motor to rotate the stage on a pitch axis and roll axis in direction to center the beam spot within the field of view of the digital camera; and defining the centered beam spot as a reference point for calibration.

7. The method of claim 6, wherein the aligning the stage with the digital camera further comprises:

reducing the adjustable aperture to confine the beam spot to a smaller portion of the field of view of the digital camera and capturing an image of the confined beam spot;

determining a fine adjustment for the tilt of the stage based on the image of the confined beam spot; and sending instruction to the motor to rotate the stage on at least one of the pitch or roll axis to align the tilt of the stage with the digital camera based on the fine adjustment.

8. The method of claim 1, further comprising:

determining if the gemstone on the stage is in focus for the digital camera, by analyzing the captured digital image of the gemstone taken by the digital camera;

if the gemstone is not in focus, by the computer, focusing the gemstone for the digital camera by determining a Z height adjustment required to focus the gemstone for the digital camera; and sending instruction to the motor to move the stage in a Z direction that corresponds to the Z height adjustment.

9. The method of claim 8, wherein the determining the Z height adjustment further comprises:

capturing, by the digital camera, a pixelated image of the gemstone on the stage;

determining, by the computer, the diameter of the gemstone based on the captured pixelated image of the gemstone;

estimating a focal plane that overlaps a focal point of the digital camera with the gemstone based on the diameter; and determining the Z height adjustment based on a distance required to move the digital camera to the focal plane.

10. The method of claim 9, wherein the determining the diameter of the gemstone further comprises:

generating a pixelated mask over the portion of the image that includes the gemstone;

determining a width of the gemstone in pixels based on the pixelated mask; and converting the width of the gemstone in pixels into a diameter of the gemstone based on a pixel size of the image and a magnification of the digital camera.

11. The method of claim 8, wherein the determining the Z height adjustment further comprises:

determining a total depth, crown height, and pavilion angle by, receiving wireframe data for the gemstone, or, capturing a gemstone shadow image;

estimating a focal plane that overlaps a focal point of the digital camera with the gemstone based on the total depth, the crown height, and pavilion angle; and determining the Z height adjustment based on a distance required to move the digital camera to the focal plane.

12. The method of claim 8, wherein the determining the Z height adjustment further comprises:

capturing, by a digital camera placed opposite the light source, a side image of the gemstone on the stage, wherein the side image is a dark image that includes an outline of the gemstone and a bright background;

determining a focal plane that overlaps a focal point of the digital camera with the gemstone based on the dark image;

determining a Z height adjustment based on a distance required to move the digital camera to the to the focal plane.

13. The method of claim 12, wherein the determining the focal plane based on the dark image further comprises:

identifying an area of the gemstone as a focus point;

determining a number of pixels between the focus point and the stage;

converting the number of pixels to a distance based on a pixel size of the dark image and a magnification of the digital camera; and determining the focal plane based on the distance.

14. A system comprising:

a computer with a processor and a memory, the computer in communication with a digital camera and at least one motor configured to rotate a stage, the digital camera having a motorized adjustable aperture and being mounted with a field-of-view covering at least a portion of the stage where a gemstone may be received for analysis;

a light source disposed offset from the digital camera and configured to generate a source of light; and a beam splitter that is positioned to reflect a portion of the source of light from the light source toward a surface of the gemstone and to transmit to the adjustable aperture and the digital camera a reflected light reflected from the surface of the gemstone; and the computer is configured to:

determine a location and a tilt of the gemstone based on an initial image captured by the digital camera by:

determining a center pixel of an area of saturated pixels in the initial image; and determining a pixel shift that equates to a number of pixels between the center pixel of the area of saturated pixels and a center pixel of a field of view of the digital camera;

send instruction to the at least one motor to rotate the stage on at least one of the pitch or roll axis using the determined pixel shift to align the tilt of the gemstone with the digital camera so that the table of the gemstone is perpendicular to the digital camera, and the table and a table reflection is visible in a field of view of the digital camera;

automatically reduce the adjustable aperture from an initial width to a reduced width to confine the reflected light to a smaller portion of the field of view of the digital camera;

send instruction to the at least one motor to move the stage in at least one of the X, Y and Z direction to center the table reflection within the field of view of the digital camera; and cause a capturing of, by the digital camera, an image of the gemstone that includes the table reflection.

15. The system of claim 14, wherein the digital camera is further configured to capture an image of the gemstone that includes the table reflection.

16. The system of claim 15, wherein the computer is further configured to perform a surface polishing and blemish analysis for the gemstone based on the table reflection.

17. The system of claim 14, wherein the digital camera is further configured to capture a second image of the gemstone that includes the confined reflected light in a portion of the field of view of the digital camera with the adjustable aperture including the reduced width; and the computer is further configured to:

determine a fine adjustment for the tilt of the gemstone based on the second image; and send instruction to the motor to rotate the stage on at least one of the pitch or roll axis to align the tilt of the gemstone with the digital camera based on the fine adjustment.

18. The system of claim 14, wherein the computer is further configured to:

determine if the gemstone on the stage is in focus for the digital camera, by analyzing the captured digital image of the gemstone taken by the digital camera;

if the gemstone is not in focus, by the computer, focus the gemstone for the digital camera by determining a Z height adjustment required to focus the gemstone for the digital camera; and send instruction to the at least one motor to move the stage in a Z direction that corresponds to the Z height adjustment.

19. The system of claim 14, wherein the light source includes one or more Light Emitting Diodes (LEDs) arranged to illuminate the stage, wherein the LEDs are configured to emit white light.

* * * * *